United States Patent
Madden

(10) Patent No.: US 11,529,653 B2
(45) Date of Patent: Dec. 20, 2022

(54) PRODUCE SORTING SYSTEMS AND METHODS

(71) Applicant: Durand-Wayland, Inc., LaGrange, GA (US)

(72) Inventor: Ian Robert Madden, Bacchus Marsh (AU)

(73) Assignee: DURAND-WAYLAND, INC., Lagrange, GA (US)

( * ) Notice: Subject to any disclaimer, the term of this patent is extended or adjusted under 35 U.S.C. 154(b) by 0 days.

(21) Appl. No.: 17/572,781

(22) Filed: Jan. 11, 2022

(65) Prior Publication Data
US 2022/0219207 A1 Jul. 14, 2022

Related U.S. Application Data

(60) Provisional application No. 63/135,888, filed on Jan. 11, 2021.

(51) Int. Cl.
| | |
|---|---|
| *B65G 17/12* | (2006.01) |
| *B07C 5/16* | (2006.01) |
| *G01G 13/22* | (2006.01) |
| *B07C 5/36* | (2006.01) |
| *B65G 17/36* | (2006.01) |

(52) U.S. Cl.
CPC ............ *B07C 5/36* (2013.01); *B07C 5/16* (2013.01); *B65G 17/12* (2013.01); *B65G 17/36* (2013.01); *B07C 2501/009* (2013.01); *B65G 2201/0211* (2013.01); *B65G 2203/0258* (2013.01)

(58) Field of Classification Search
CPC .. B07C 5/16; B07C 5/36; B65G 17/12; B65G 17/36; G01G 13/22

USPC .................................................. 198/375, 538
See application file for complete search history.

(56) References Cited

U.S. PATENT DOCUMENTS

| | | | | |
|---|---|---|---|---|
| 2,969,867 | A | * 1/1961 | McClelland | A23N 4/04 |
| | | | | 414/757 |
| 3,590,994 | A | * 7/1971 | Goudreau | B07B 13/07 |
| | | | | 53/248 |
| 4,940,536 | A | * 7/1990 | Cowlin | B07C 5/362 |
| | | | | 209/912 |
| 5,078,258 | A | 1/1992 | School | |
| 5,101,982 | A | 4/1992 | Gentili | |
| 5,157,899 | A | 10/1992 | Tas | |
| 5,159,796 | A | 11/1992 | Tas | |

(Continued)

FOREIGN PATENT DOCUMENTS

| | | |
|---|---|---|
| AU | 2011201654 A1 | 10/2011 |
| EP | 0489478 A1 | 6/1992 |

(Continued)

OTHER PUBLICATIONS

US 9,446,433 B2, 09/2016, Kennedy et al. (withdrawn)

(Continued)

*Primary Examiner* — Douglas A Hess
(74) *Attorney, Agent, or Firm* — Kilpatrick Townsend & Stockton LLP

(57) ABSTRACT

Produce sorting systems and methods that utilize a conveyor system to move produce through stages such as singulation, camera inspection, weight, and sorting. The sorting systems and methods may utilize conveyor systems having carrier segments that provide for increased speed, efficiency, accuracy, reliability, durability, and lower maintenance.

30 Claims, 33 Drawing Sheets

(56) References Cited

U.S. PATENT DOCUMENTS

| | | | |
|---|---|---|---|
| 5,190,137 A | 3/1993 | Tas | |
| 5,208,997 A | 5/1993 | Tas | |
| 5,230,394 A | 7/1993 | Blanc | |
| 5,237,407 A | 8/1993 | Crezee et al. | |
| 5,244,100 A | 9/1993 | Regier et al. | |
| 5,449,911 A | 9/1995 | Crezee | |
| 5,477,955 A | 12/1995 | Madden et al. | |
| 5,611,419 A | 3/1997 | LaVars | |
| 5,611,437 A | 3/1997 | Okada | |
| 5,677,516 A * | 10/1997 | Leverett | B07C 5/36 |
| | | | 177/52 |
| 5,878,863 A | 3/1999 | Madden et al. | |
| 6,234,300 B1 * | 5/2001 | De Vos | B65G 47/90 |
| | | | 198/470.1 |
| 6,267,249 B1 | 7/2001 | Carpenter et al. | |
| 6,276,510 B1 | 8/2001 | Lavars | |
| 6,512,577 B1 | 1/2003 | Ozanich | |
| 6,539,781 B1 | 4/2003 | Crezee | |
| 6,627,826 B2 | 9/2003 | Cavina et al. | |
| 6,659,287 B1 | 12/2003 | Hawkins | |
| 6,847,447 B2 | 1/2005 | Ozanich | |
| 7,173,246 B2 | 2/2007 | Benedetti et al. | |
| 7,222,715 B2 | 5/2007 | Madden et al. | |
| 7,263,955 B1 | 9/2007 | Fischer | |
| 7,278,814 B2 | 10/2007 | Benedetti | |
| 7,395,914 B2 | 7/2008 | van Wijngaarden et al. | |
| 7,410,044 B2 | 8/2008 | Kennedy | |
| 7,731,015 B2 | 6/2010 | Abe et al. | |
| 7,775,305 B1 | 8/2010 | Fischer | |
| 7,946,429 B2 | 5/2011 | Kennedy | |
| 7,975,828 B2 | 7/2011 | Tas et al. | |
| 8,061,501 B2 | 11/2011 | Benedetti | |
| 8,061,503 B2 | 11/2011 | Ancarani | |
| 8,272,322 B2 | 9/2012 | Benedetti | |
| 8,317,032 B2 | 11/2012 | Crezee | |
| 8,567,588 B2 | 10/2013 | Junk | |
| 8,640,859 B2 | 2/2014 | Ecob | |
| 8,714,365 B2 * | 5/2014 | Morley | B65G 23/06 |
| | | | 209/617 |
| 8,746,435 B2 * | 6/2014 | Nijland | B07C 5/18 |
| | | | 198/370.09 |
| 8,757,054 B2 | 6/2014 | Benedetti | |
| 8,776,986 B2 | 7/2014 | Morley | |
| 9,004,287 B2 * | 4/2015 | Liedl | B65G 47/962 |
| | | | 209/541 |
| 9,045,293 B2 | 6/2015 | Benedetti | |
| 9,126,758 B2 | 9/2015 | Kennedy et al. | |
| 9,186,705 B2 | 11/2015 | Benedetti | |
| 9,216,864 B1 | 12/2015 | Plessius | |
| 9,357,799 B2 | 6/2016 | Benedetti | |
| 9,415,429 B2 | 8/2016 | Benedetti | |
| 9,415,938 B2 * | 8/2016 | Oropeza | B65G 47/962 |
| 9,442,055 B2 | 9/2016 | Benedetti et al. | |
| 9,475,655 B2 | 10/2016 | Cook et al. | |
| 9,527,113 B2 * | 12/2016 | Kennedy | B65G 47/965 |
| 9,527,680 B2 | 12/2016 | Anstis et al. | |
| 9,533,837 B2 | 1/2017 | Stitt et al. | |
| 9,630,733 B2 | 4/2017 | Benedetti | |
| 9,670,006 B2 | 6/2017 | Ruigrok | |
| 9,694,366 B2 | 7/2017 | Blanc | |
| 9,840,376 B2 | 12/2017 | White et al. | |
| 10,011,440 B2 | 7/2018 | Anstis et al. | |
| 10,093,490 B2 | 10/2018 | Benedetti | |
| 10,094,701 B2 * | 10/2018 | Blanc | B65G 47/962 |
| 10,099,258 B2 | 10/2018 | Galbraith et al. | |
| 2008/0185267 A1 | 8/2008 | Benedetti | |
| 2008/0223000 A1 | 9/2008 | Macdonald | |
| 2009/0306814 A1 | 12/2009 | Madden | |
| 2011/0186405 A1 | 8/2011 | Blanc et al. | |
| 2011/0203612 A1 | 8/2011 | Blanc | |
| 2011/0203617 A1 | 8/2011 | Blanc | |
| 2013/0043104 A1 | 2/2013 | Morley | |
| 2013/0340393 A1 | 12/2013 | Benedetti | |
| 2014/0166551 A1 | 6/2014 | Blanc | |
| 2015/0177157 A1 | 6/2015 | Edmondson et al. | |
| 2015/0246358 A1 | 9/2015 | Benedetti | |
| 2016/0107777 A1 | 4/2016 | Benedetti | |
| 2016/0200469 A1 | 7/2016 | Benedetti | |
| 2016/0318642 A1 | 11/2016 | Benedetti | |
| 2017/0121042 A1 | 5/2017 | Benedetti | |
| 2017/0121122 A1 | 5/2017 | Blanc | |
| 2017/0188619 A1 | 7/2017 | Benedetti | |
| 2017/0233201 A1 | 8/2017 | Benedetti | |
| 2017/0240308 A1 | 8/2017 | Benedetti | |
| 2017/0347690 A1 | 12/2017 | Benedetti | |
| 2018/0100758 A1 | 4/2018 | Blanc | |
| 2018/0126420 A1 | 5/2018 | Goodger et al. | |
| 2018/0133758 A1 | 5/2018 | Benedetti | |
| 2018/0148270 A1 | 5/2018 | Benedetti | |
| 2018/0252691 A1 | 9/2018 | Blanc | |
| 2018/0257109 A1 | 9/2018 | Benedetti | |
| 2018/0281022 A1 | 10/2018 | Benedetti | |

FOREIGN PATENT DOCUMENTS

| | | |
|---|---|---|
| EP | 0553933 A1 | 8/1993 |
| EP | 1508543 B1 | 10/2006 |
| EP | 1733807 A1 | 12/2006 |
| EP | 1880619 B1 | 9/2011 |
| EP | 2379428 B1 | 4/2013 |
| EP | 2437897 B1 | 5/2013 |
| EP | 2468637 B1 | 5/2013 |
| EP | 3405298 A1 | 11/2018 |
| EP | 3405415 A1 | 11/2018 |
| EP | 3408198 A1 | 12/2018 |
| EP | 3408199 A1 | 12/2018 |
| EP | 3414190 A1 | 12/2018 |
| FR | 2960866 B1 | 6/2012 |
| FR | 2961373 B1 | 8/2012 |
| FR | 2974567 A1 | 11/2012 |
| FR | 2966754 B1 | 1/2013 |
| FR | 2976196 B1 | 7/2013 |
| FR | 2987826 B1 | 3/2014 |
| FR | 2983458 B1 | 7/2014 |
| FR | 2985025 B1 | 12/2014 |
| FR | 3048242 A1 | 9/2017 |
| FR | 3049269 A1 | 9/2017 |
| FR | 3044245 B1 | 12/2017 |
| FR | 3055890 A1 | 3/2018 |
| NL | 1001697 C2 | 11/1996 |
| NL | 2010623 C2 | 10/2014 |
| NZ | 615109 A | 11/2014 |
| NZ | 617389 A | 5/2015 |
| NZ | 717040 A | 4/2017 |
| WO | 1998/033046 A1 | 7/1998 |
| WO | 2007/000441 A1 | 1/2007 |
| WO | 2007/000442 A1 | 1/2007 |
| WO | 2012/017170 A1 | 2/2012 |
| WO | 2012/021074 A2 | 2/2012 |
| WO | 2012/074417 A1 | 6/2012 |
| WO | WO 2012/138219 A1 * | 10/2012 |
| WO | 2012/146841 A1 | 11/2012 |
| WO | 2015/167345 A1 | 11/2015 |
| WO | 2015/174853 A1 | 11/2015 |
| WO | 2016/018157 A1 | 2/2016 |
| WO | 2017/144534 A1 | 8/2017 |
| WO | 2017/144632 A1 | 8/2017 |
| WO | 2017/187076 A1 | 11/2017 |
| WO | 2018/004362 A1 | 1/2018 |
| WO | WO 2018/122678 A1 * | 7/2018 |
| WO | 2018/211384 A1 | 11/2018 |
| WO | 2018/211385 A1 | 11/2018 |

OTHER PUBLICATIONS

US 2001/0032807 A1, Powell, Jr., Oct. 25, 2001.*
US 2007/0102265 A1, Van Den Berg et al., May 10, 2007.*
International Search Report and Written Opinion, PCT Patent Application No. PCT/US2022/011909, dated May 27, 2022.

* cited by examiner

Rollers supported by timing belts

Rollers supported by timing belts

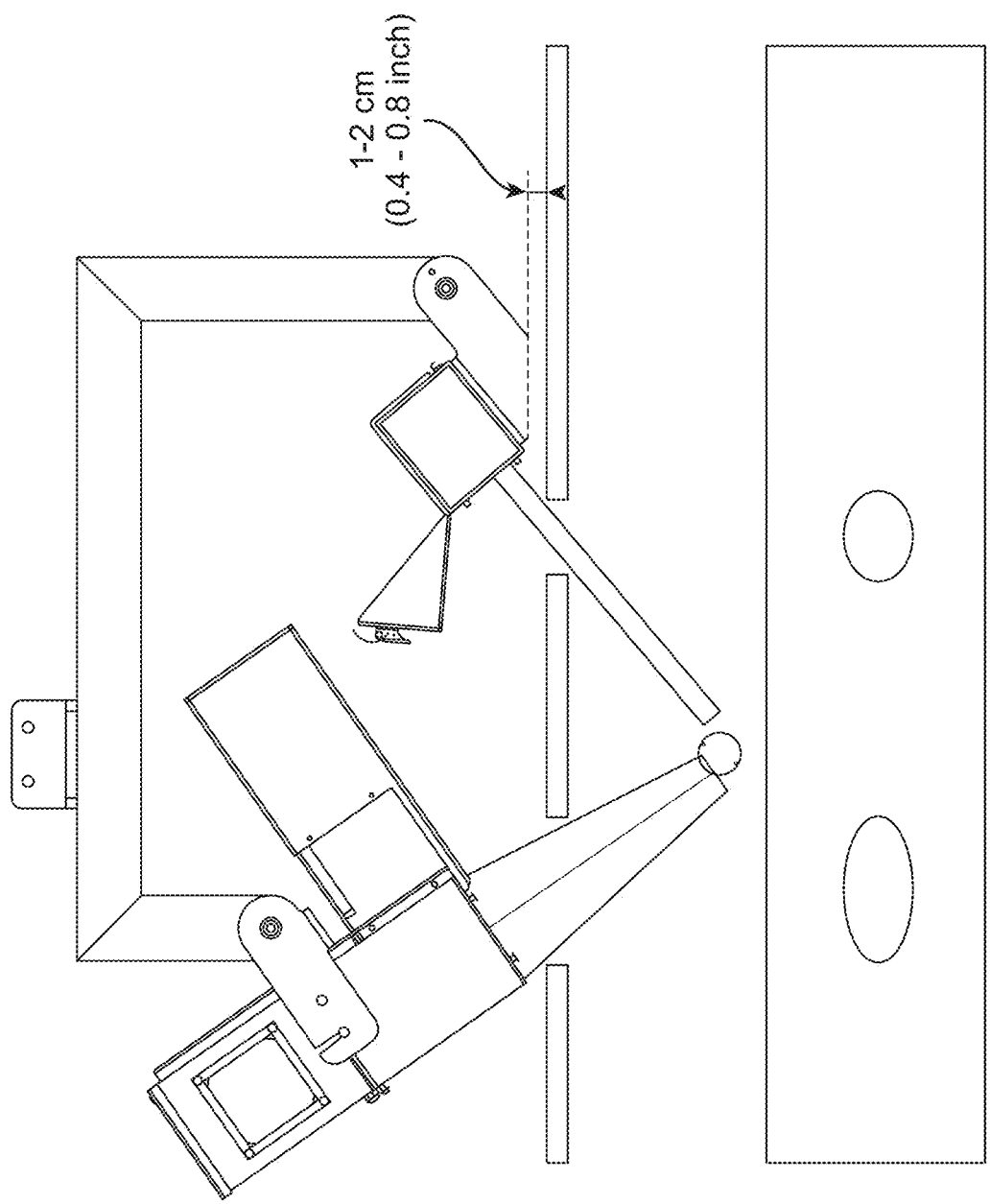

PRODUCE SORTING SYSTEMS AND METHODS

RELATED APPLICATIONS

This application claims the benefit of and priority to U.S. Provisional Patent Application Ser. No. 63/135,888 filed Jan. 11, 2021, the entire contents of which are hereby incorporated by reference.

BACKGROUND

Produce such as fruit or vegetables can be sorted by transporting it along a conveyor line in a manner that facilitates automated analysis of individual produce items to evaluate a variety of quantitative and/or qualitative metrics, with the transport system subsequently sorting the fruit or vegetable item into groups based on sorting criteria and the determined metrics. Fruits and vegetables can be sorted based on size (weight and/or dimension), grade qualities (color, blemish, other external quality (EQ), and/or internal quality (IQ)), and/or other sorting criteria. This patent describes improved systems and methods for produce sorting.

SUMMARY

This patent describes an example of a produce sorting system and method that includes four general stages: (1) singulation, (2) camera inspection, (3) weighing, and (4) sorting. The system's conveyor line includes carrier segments that provide for increased speed, efficiency, accuracy, reliability, durability, and lower maintenance. The example described below is provided for illustration only, and does not limit the scope or spirit of the inventions of this patent. Additions, deletions, substitutions, and other modifications can be made to the fruit sorting system and method described below, and to the components used by that system and method, without departing from the scope or spirit of this patent.

In one example, a produce sorting system includes: (a) more than one segments, the segments including at least a produce weighing segment and a produce sorting segment; and (b) a conveyor configured to move produce items to the segments, the conveyor including several carrier units connected to one another, with at least some of the carrier units each including: (i) a carrier frame, the frame having a first side, a second side opposite the first side, a first end, and a second end opposite the first end, the carrier frame linked to carrier frames of adjacent carrier units at the first and second ends; (ii) a produce roller retained by the carrier frame, the produce roller configured to be moved between raised and lowered states relative to the carrier frame; and (iii) a produce cup, the produce cup configured to discharge a produce item from the produce cup at the produce sorting segment by tipping from an upright state to the first side of the carrier frame and tipping from the upright state to the second side of the carrier frame, the produce cup further configured to move along a vertical axis relative to the carrier frame to facilitate weighing the produce item in the produce cup at the produce weighing segment, the produce cup supported by a weighing member when the produce cup is in the upright state, the weighing member including a weighing surface configured to contact a load cell of the weighing segment, the weighing surface being located underneath the produce cup when in the upright state and between the first and second sides of the carrier frame.

The weighing member may be a post, an end of the post extending between the first and second sides of the link body.

The weighing surface may be on the end of the post, and located directly underneath a center of the produce cup.

The post may be connected to the carrier frame.

The post may be connected to the carrier frame by a floating arm linkage.

The floating arm linkage may be a pair of linkage arms, each linkage arm having pivot axes that are parallel to a rotation axis of the produce roller.

The produce cup may be connected to the post in a rotating fashion.

The produce cup further may also include a pair of tipping arms.

The carrier frame may include one or more vertical slots configured to retain the produce roller while allowing the produce roller to move between the raised and lowered states.

The produce roller may include an axle extending through the one or more vertical slots of the carrier frame.

The carrier frame may have one or more plastic bodies, the one or more plastic bodies including a pair of internal metal plates extending along the first and second sides of the carrier frame.

The carrier frame may be linked to carrier frames of adjacent carrier units by link pins extending through the metal plates.

The conveyor may include one or more guide tracks, and the carrier frame include one or more guide surfaces configured to interact with the guide tracks.

The one or more guide tracks may be a pair of guide tracks, with the first side of the carrier frame including one of the guide surfaces and the second side of the carrier frame including the other guide surface.

The carrier frame may have a first side carrier frame and a second side carrier frame, the weighing surface located between the first and second side carrier frames.

In another example, a carrier unit for a produce sorting system includes: (i) a carrier frame, the frame comprising a first side, a second side opposite the first side, a first end, and a second end opposite the first end, the carrier frame including linking structure at the first and second ends configured to link to carrier frames of adjacent carrier units; (ii) a produce roller retained by the carrier frame, the produce roller configured to be moved between raised and lowered states relative to the carrier frame; and (iii) a produce cup, the produce cup configured to tip from an upright state to the first side of the carrier frame and to tip from the upright state to the second side of the carrier frame, the produce cup further configured to move along a vertical axis relative to the carrier frame, the produce cup supported by a weighing member when the produce cup is in the upright state, the weighing member including a weighing contact surface located underneath the produce cup when in the upright state and between the first and second sides of the carrier frame.

BRIEF DESCRIPTION OF THE DRAWINGS

FIGS. 16a-c show examples of an internal quality inspection sub-system of a fruit sorting system.

DETAILED DESCRIPTION

Figure 1:
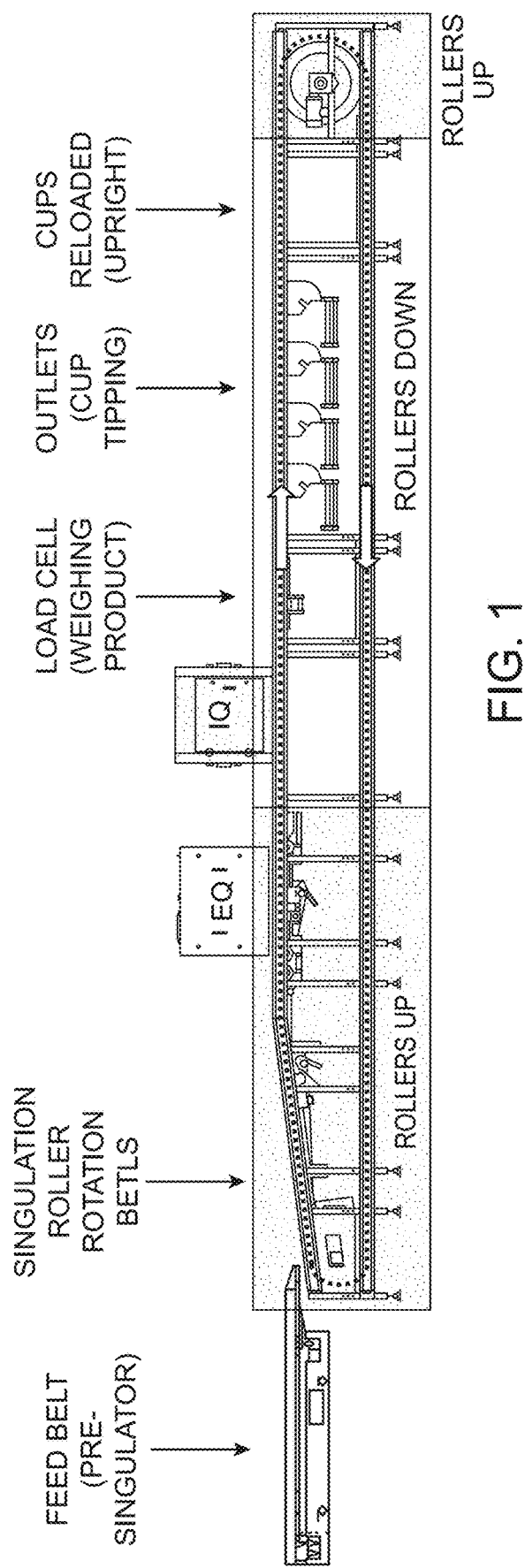
FIG. 1 schematically illustrates an example of a produce sorting system.

FIG. 1 shows an overview of one example of a produce sorting system and method. The system of FIG. 1 includes (from left to right) a pre-singulator segment where the produce is fed into the system, a singulation segment where the produce is singulated, two inspection segments (EQ and IQ) where qualitative and quantitative aspects of the produce are evaluated, a weighing segment where the produce is weighed, an outlet segment where the produce is sorted into groups, and a reloading segment where cup components of the system are reset to their original positions for re-use in the next cycle of the system. In the following description, the specific system and method described are for a fruit sorting system, although the systems and methods described are equally applicable for a vegetable or other produce sorting system.

A conveyor transports the fruit through most of the system's segments. The conveyor is formed of individual carrier units joined by pins to form an endless chain of linked carrier units. A driven sprocket at one end of the conveyor drives the carrier units, and an idler sprocket at the other end maintains tension in the chain. The drive sprocket is larger (e.g. 24 tooth) than the idler sprocket (e.g. 16 teeth) and the sprockets are arranged and the conveyor is otherwise configured so that it includes an uphill inclination in the singulation segment. The incline helps to cingulate the fruit, which is discussed further below. Alternatively, the singulation segment could be level or flat.

The individual carrier units of the conveyor each include a roller assembly. As shown in FIG. 1, the rollers of the conveyor are in either an up or down state depending on the particular segment. When the rollers are in an up state and rotating, their rotation will also rotate the fruit being conveyed. When the rollers are in a down state, the fruit will be supported by cups located between the rollers.

Carrier Units

Figure 2:
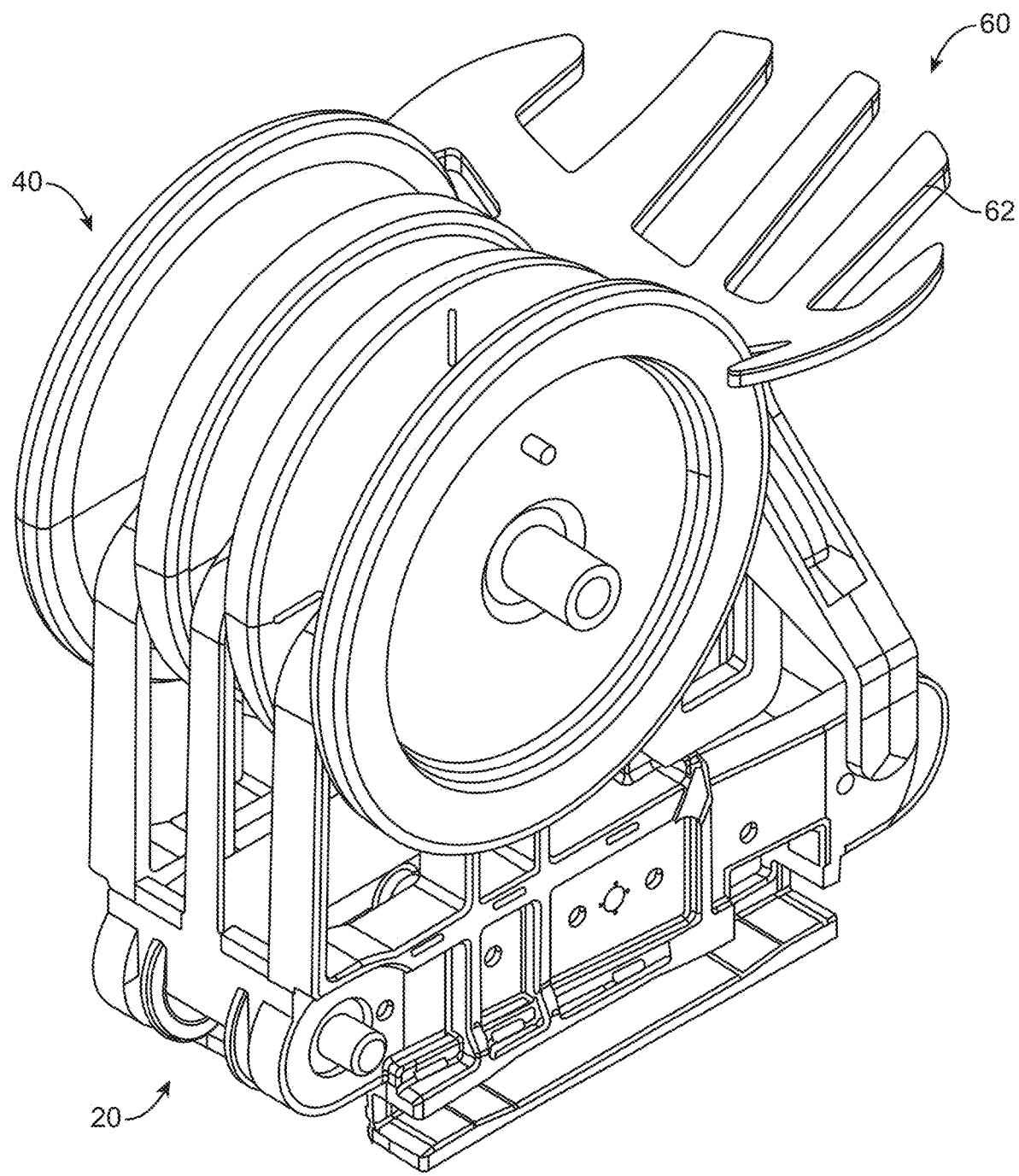
FIG. 2 shows an example of a carrier unit of a produce sorting system.
Figure 3A:
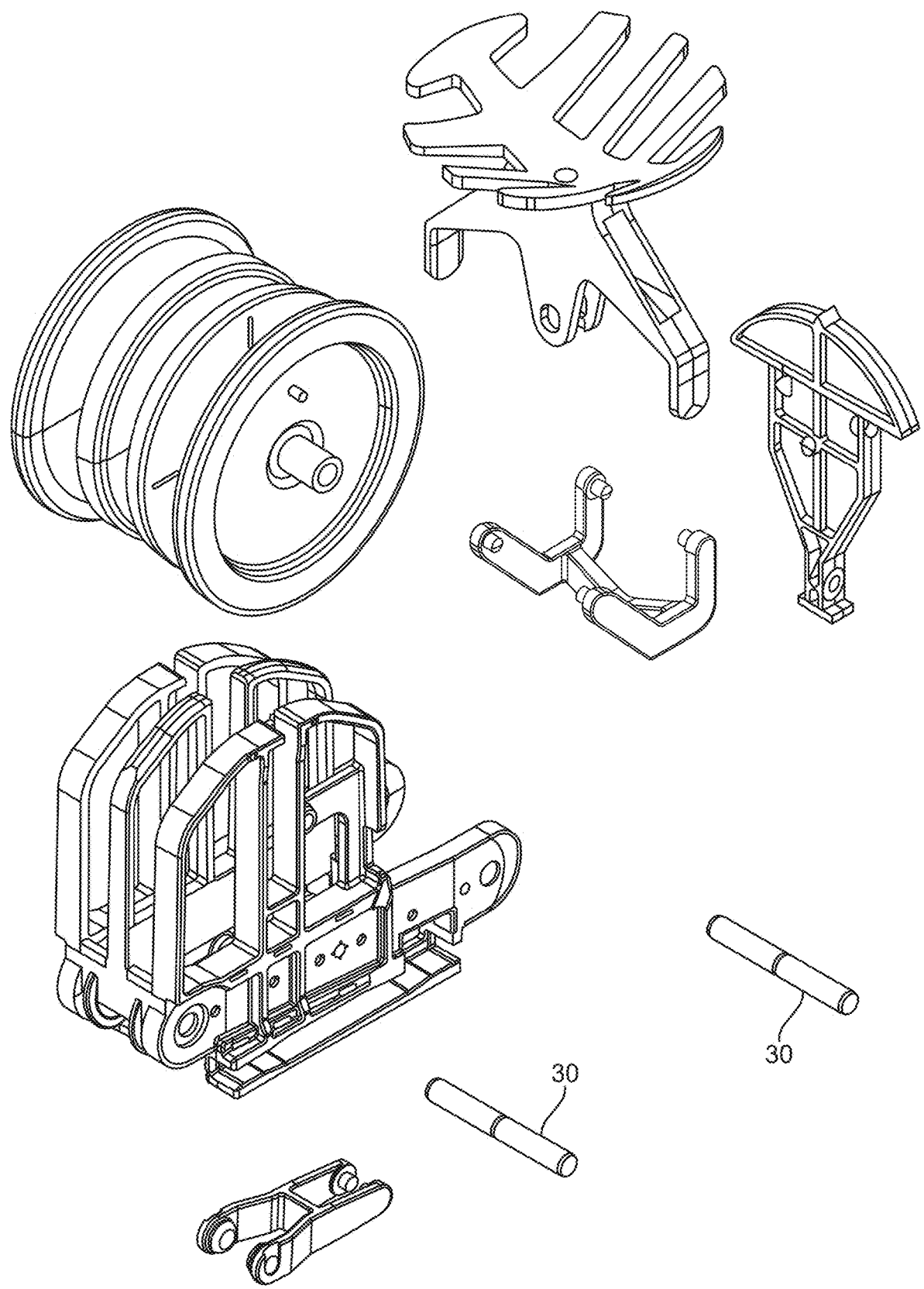
FIG. 3a shows the carrier unit of FIG. 2 in an exploded view.
Figure 3B:
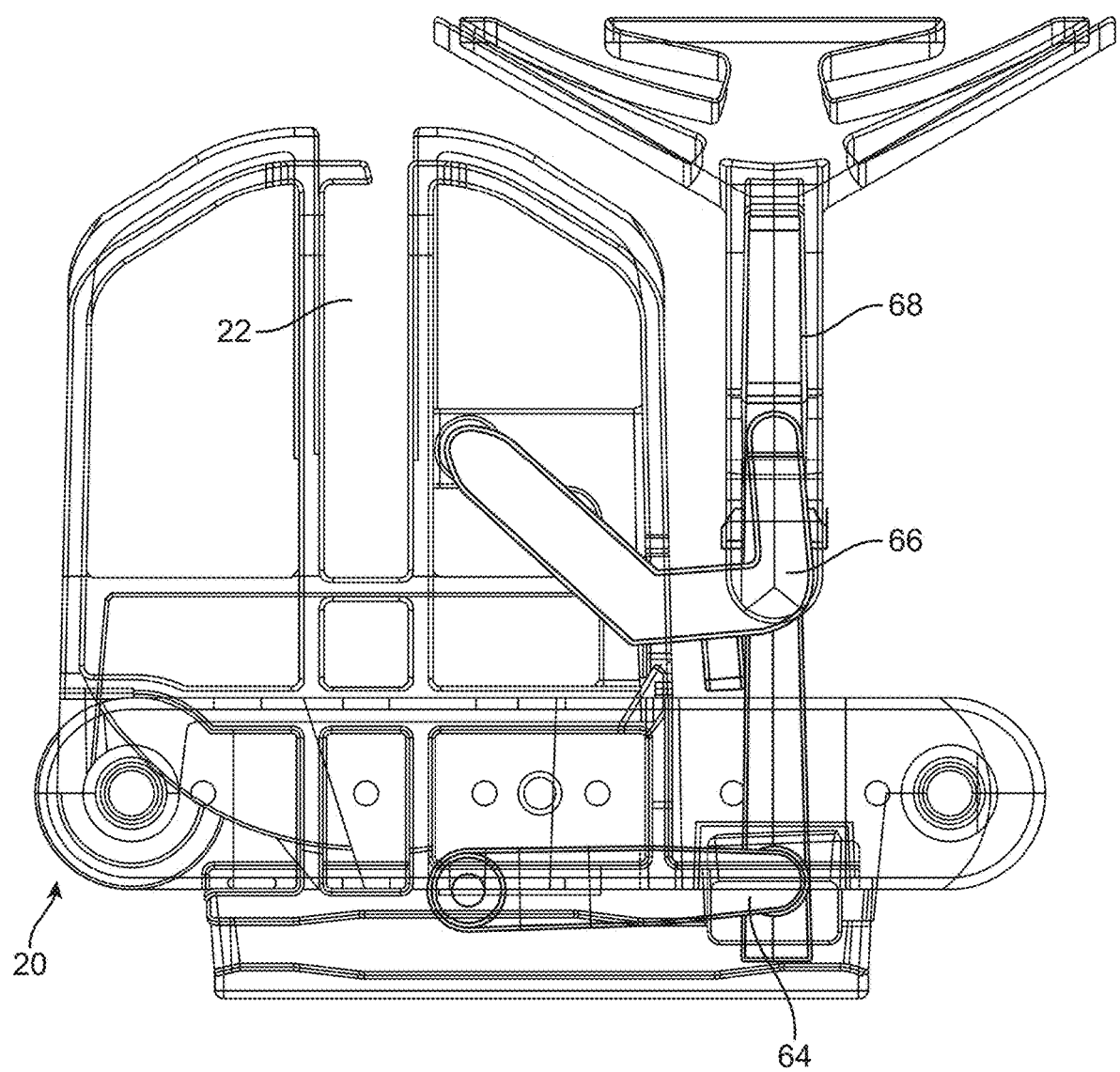
FIGS. 3b-e show additional views of the carrier unit of FIG. 2.
Figure 3C:
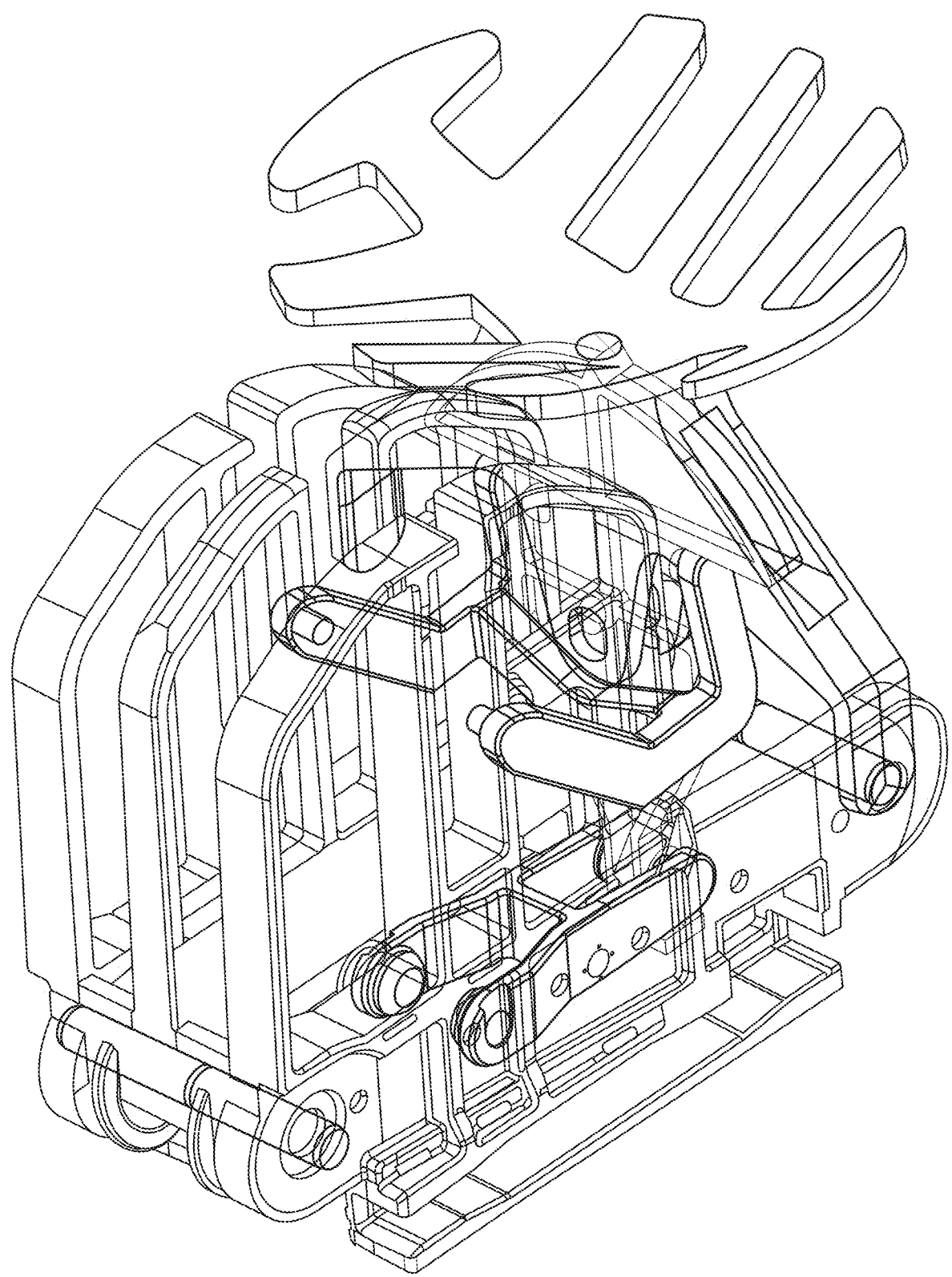
Figure 3D:
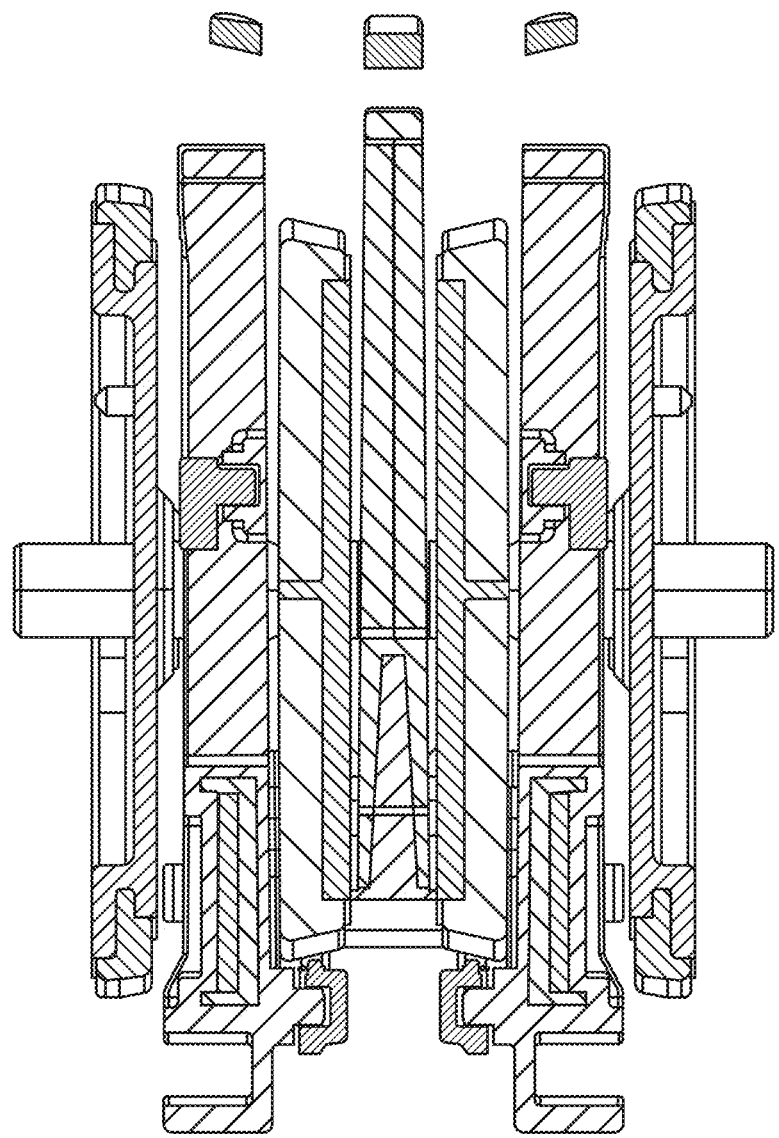
Figure 3E:
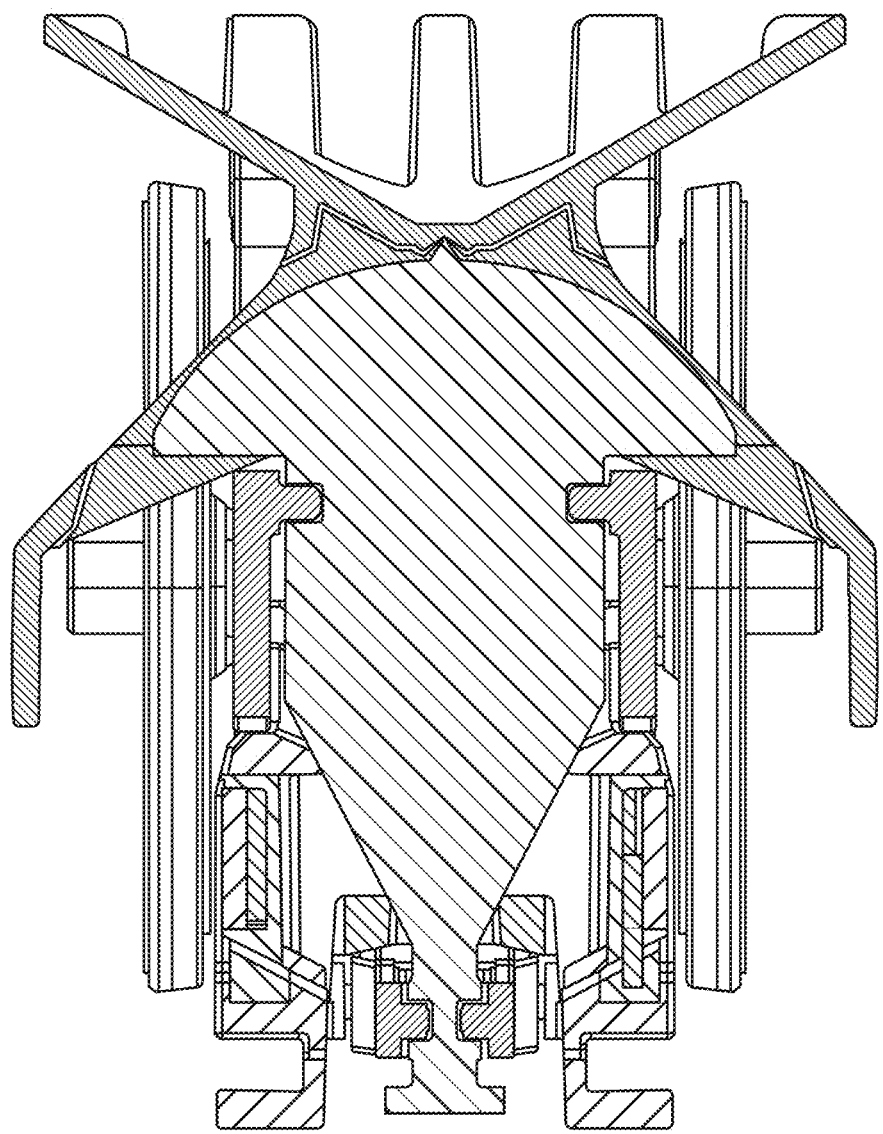
Figure 4:
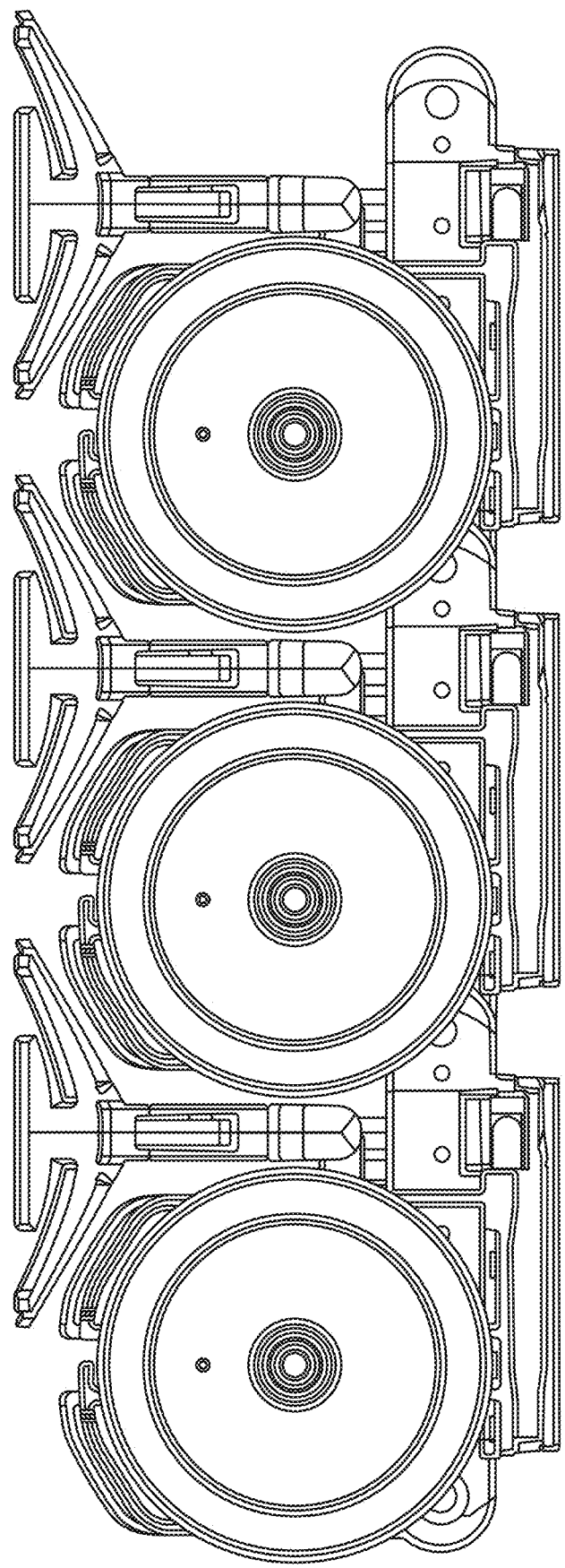
FIG. 4 shows an example of three carrier units linked together.

FIGS. 2-13 illustrate one example of a carrier unit. FIG. 2 shows the carrier unit assembled, and FIG. 3a shows the carrier unit dis-assembled. FIG. 4 shows three carrier units connected together. FIGS. 5-13 show components of the carrier unit.

The carrier unit of this example includes a link assembly 20, a roller assembly 40, and a cup assembly 60. The link assembly 20 forms the body of the carrier unit. The roller assembly 40 is mounted in a vertical slot 22 of the link assembly 20 such that it can be raised and lowered freely in the slot. The cup 62 of the cup assembly 60 can be raised and lowered freely relative to the link and roller assemblies. The cup 62 can also be tilted laterally. Each of the link, roller, and cup assembly are discussed in further detail below.

Link Assembly

Figure 5:
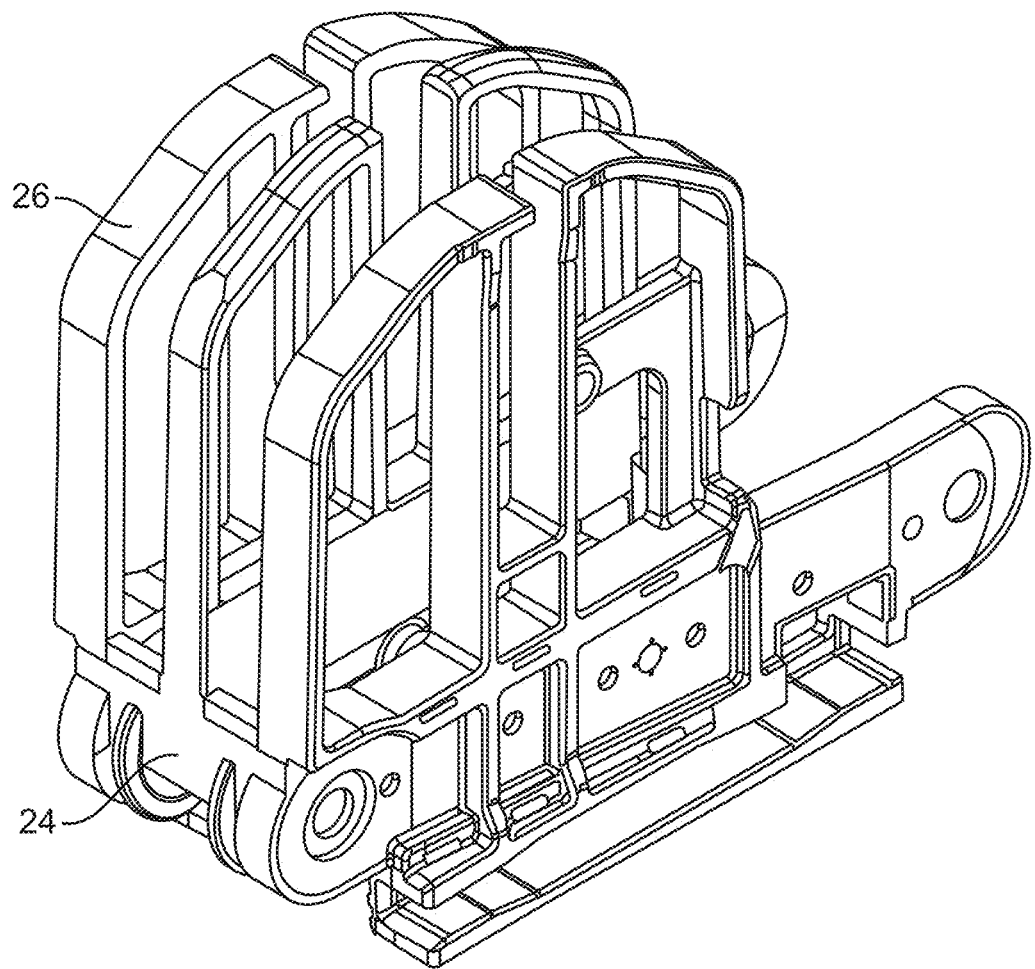
FIG. 5 shows a link assembly of the carrier unit of FIG. 2.

The link assembly of this example is shown in more detail in FIGS. 5 (assembled) and 6 (dis-assembled). The link assembly functions both as the body or frame of the carrier unit as well as the "link" in the conveyor chain. That is different from some earlier fruit sorting systems, in which the carrier units were separate from the metal "links" of the conveyor chain that were used to drive the carrier units along the conveyor line. By eliminating the separate metal conveyor chain, clean-ability and food safety of the overall system may be enhanced. Some, although not necessarily all, implementations of sizers described herein have a chain pitch that is approximately half of many prior art sizers that use traditional metal conveyor chains to drive separate carrier components mounted on the chain, resulting in a 50% reduction of wear points, points of sanitation concern, and contact points that interact with the drive and idler sprockets, and otherwise allowing for reduction in sanitation and maintenance issues. In some non-limiting, exemplary implementations, the chain pitch of the systems and methods of this patent may be in the range of 2 inches to 6 inches, in the range of 3 inches to 5 inches, or in the range of 3.5 inches to 4.5 inches.

Figure 6:
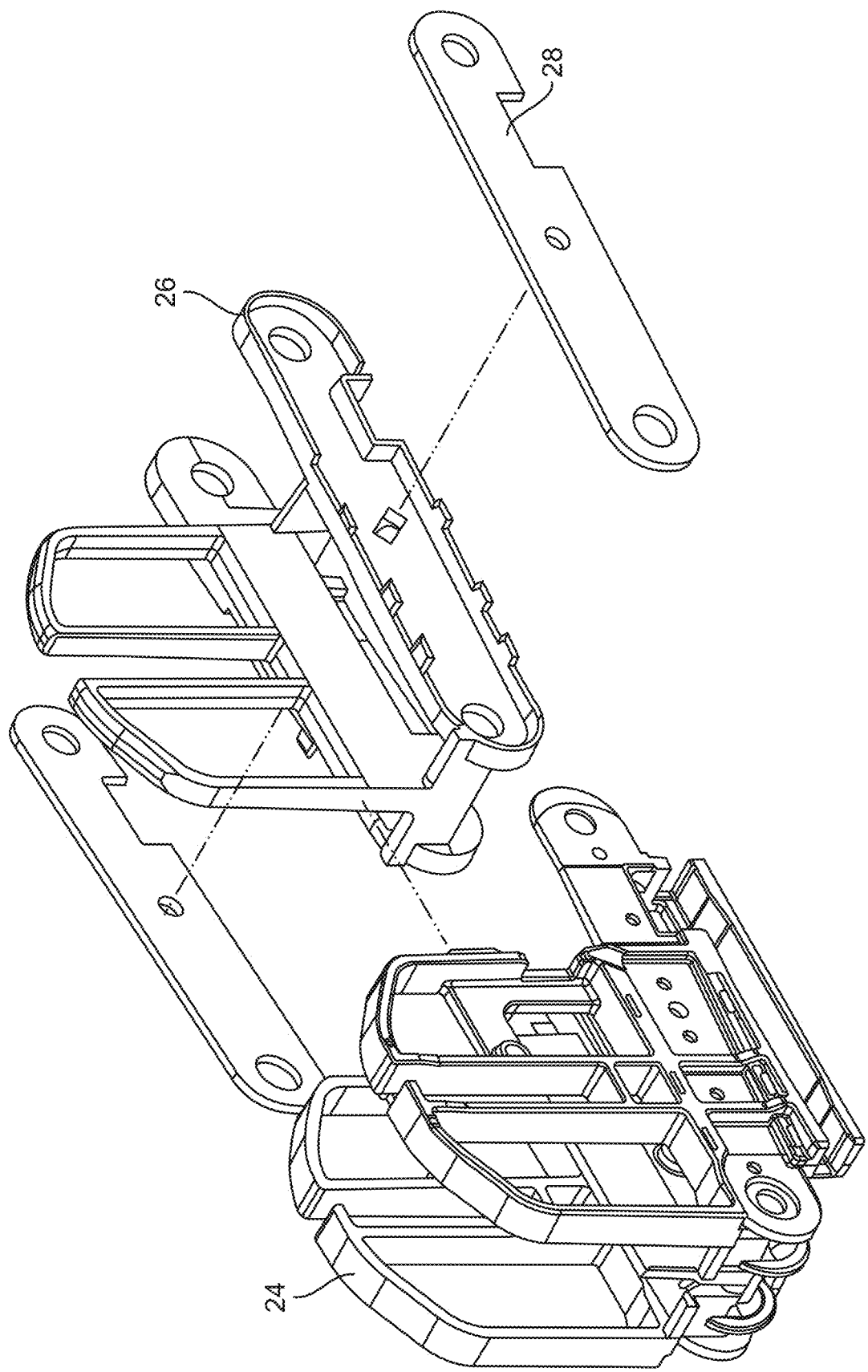
FIG. 6 shows the link assembly of FIG. 5 in an exploded view.
Figure 13:
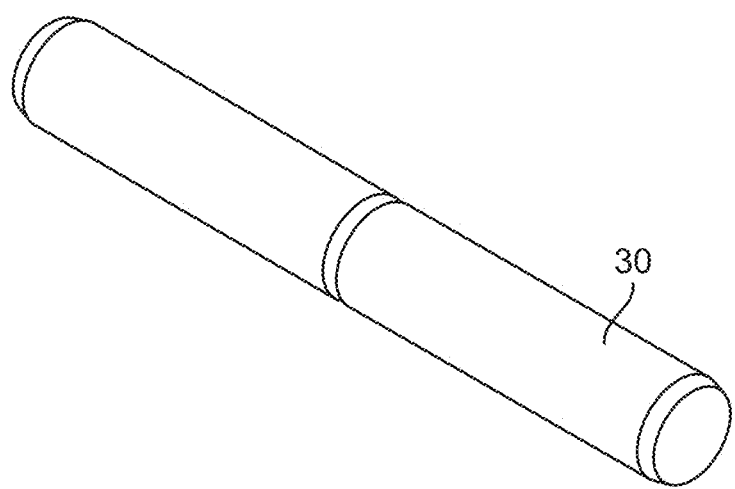
FIG. 13 shows a pin of the carrier unit of FIG. 2.

The link assembly of FIGS. 5 and 6 includes plastic inner 24 and outer 26 bodies that define cavities for receiving stainless steel side plates 28. The stainless steel side plates 28 provide strength to the link assembly while being protected from corrosion or other damage within the inner and outer plastic bodies. Stainless steel pins 30 pass through openings in the inner and outer bodies and the side plates to connect the carrier unit to adjacent carrier units (see FIG. 3a). By attaching the carrier units together with stainless steel pins, they form a chain. Plastic encapsulates the openings the pins go in providing an outstanding, minimally wearing pivot surface. In this example, all carrier components are made from FDA-Approved material and the integrated design greatly contributes to a more food-safe product. FIG. 13 shows an example of a steel pin 30, including a locking groove in the center to facilitate adding or removing carrier assemblies. When installed, the locking grove engages an annular rib in the link assembly to hold the pin in place.

Figure 7:
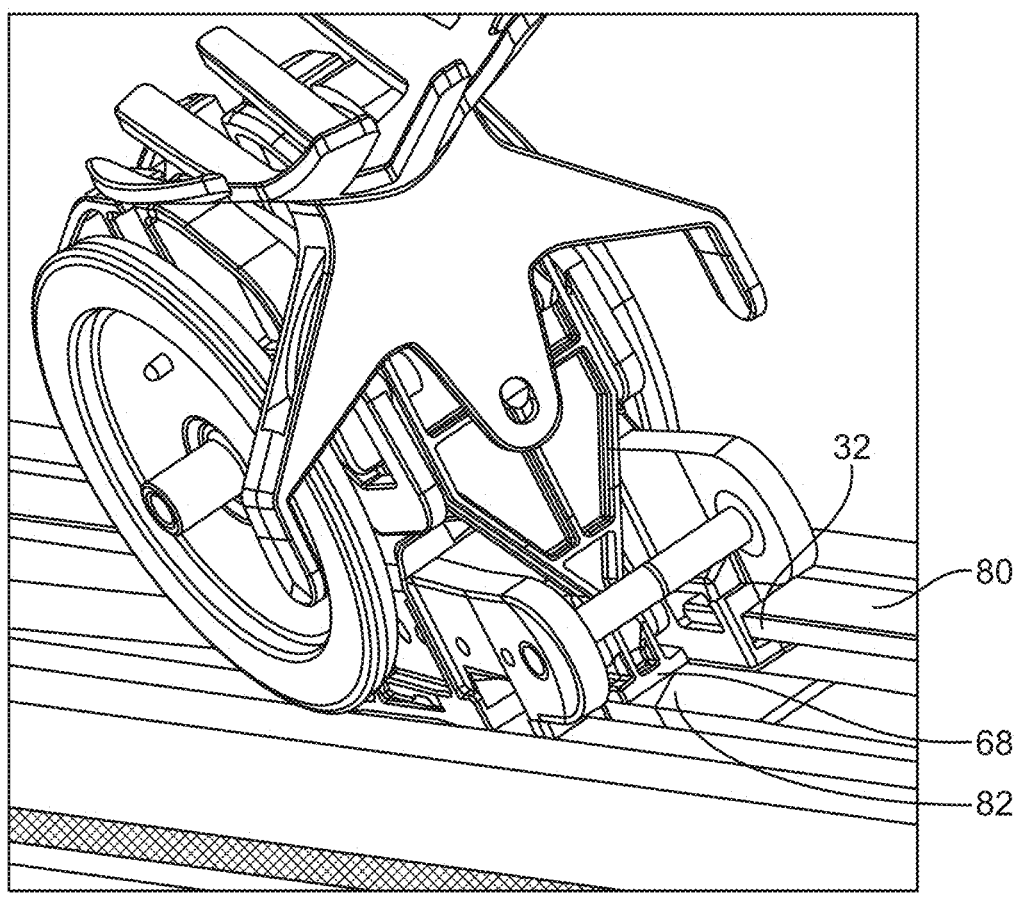
FIG. 7 shows an example of a carrier unit mounted on tracks of a produce sorting system.

As shown in FIG. 7, the link assembly includes grooves 32 for receiving horizontal tracks 80 that constrain and guide the movement of the conveyor line. These tracks stabilize the carrier, minimizing left to right movement, and lower the risk that fruit will fall off the carrier. Some conventional sizers have a single track in the center under the metal chain, which is less stable, and from vibration and wear, can easily tilt the carrier, causing fruit to fall off. The two horizontal tracks 80 also form the return track under the conveyor line. This track supports the link assemblies as they return to the beginning of the line.

Cup Assembly

Figure 8:
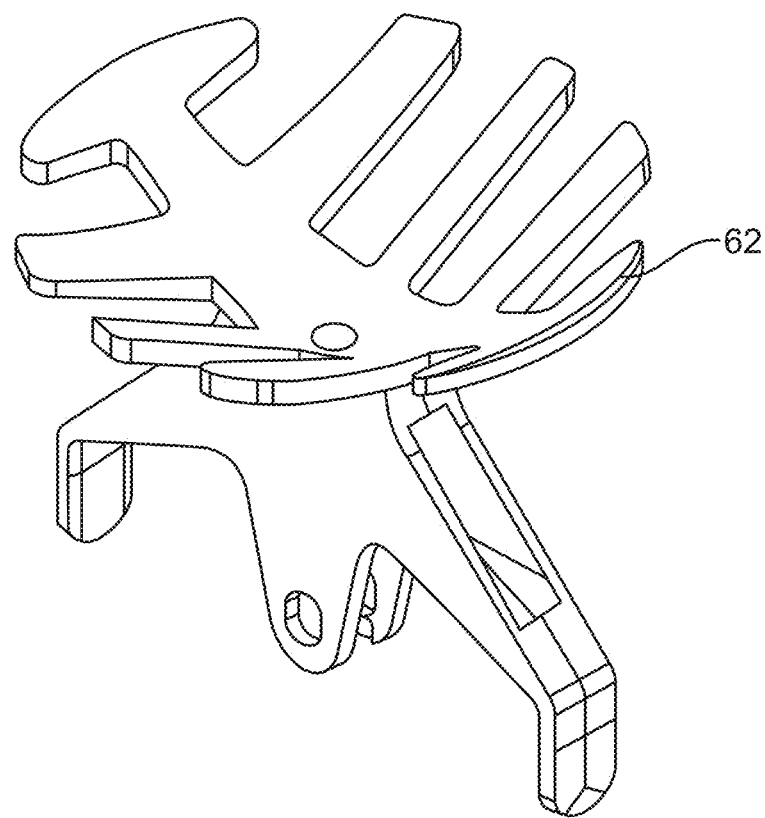
FIG. 8 shows a cup of the carrier unit of FIG. 2.

The cup assembly 60 includes arms 64, 66 (FIGS. 11 and 12), which connect to a weigh post 68 (FIG. 10), which in turn connects to the cup 62 (FIG. 8).

The cup 62 cradles a fruit when the cup is in a centered position and the roller assembly (discussed below) is in a down position. The cup 62 can be tilted left or right to discharge the fruit when struck by a solenoid arm as discussed in additional detail in later sections.

The weigh post 68 includes a bottom surface 70 for making contact with a load cell to facilitate weighing of the fruit held in the cup. The weigh post 68 also includes a center point 72 for latching the cup in a centered, upright position, as well as attachments 74 for connecting to ends of arms 64, 66 in a rotating fashion.

The lower and upper arms 64, 66 both include pins for attachment to the link assembly 20 and weigh post 68, and together form a floating parallel arm linkage that facilitate movement of the weigh post 68 and attached cup 62 along a vertical axis relative to the link assembly 20. FIGS. 3*b-e* show additional views of the carrier assembly, further illustrating how the arms connect the weigh post 68 to the link assembly 20.

Roller Assembly

Figure 9:
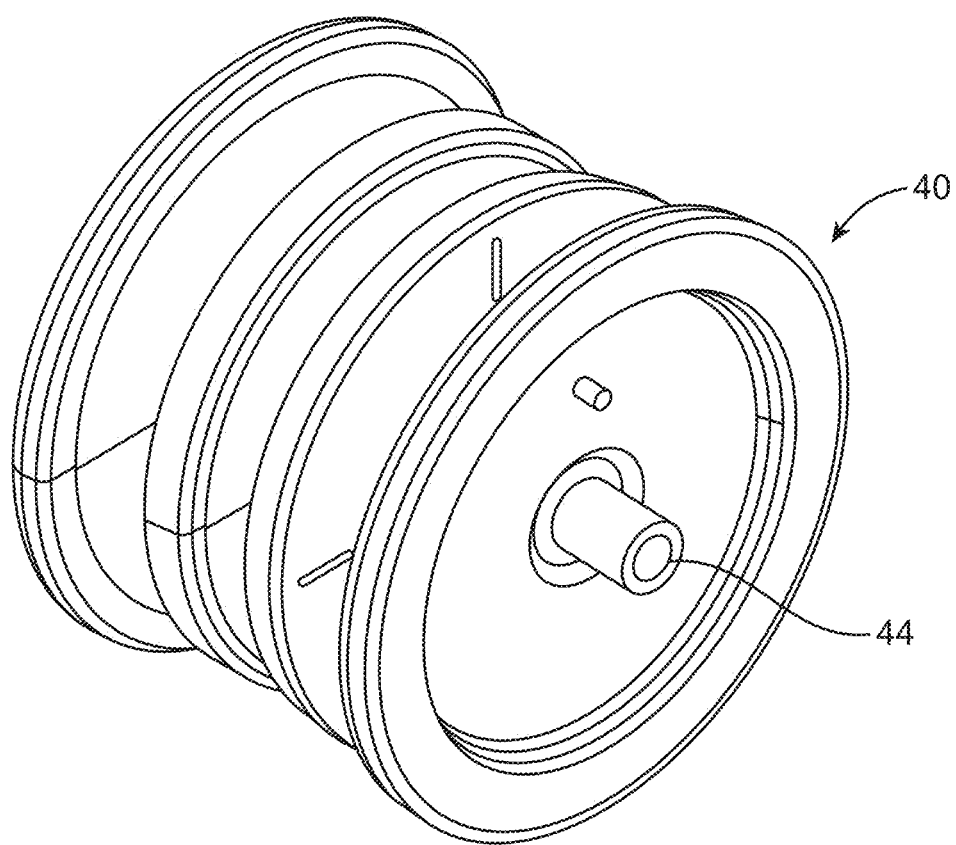
FIG. 9 shows a roller assembly of the carrier unit of FIG. 2.
Figure 10:
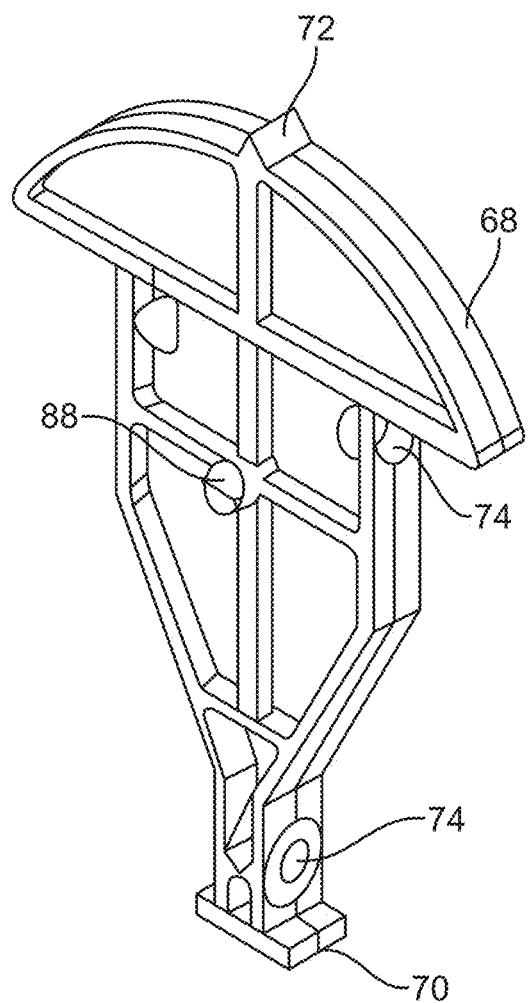
FIG. 10 shows a weigh post of the carrier unit of FIG. 2.
Figure 11:
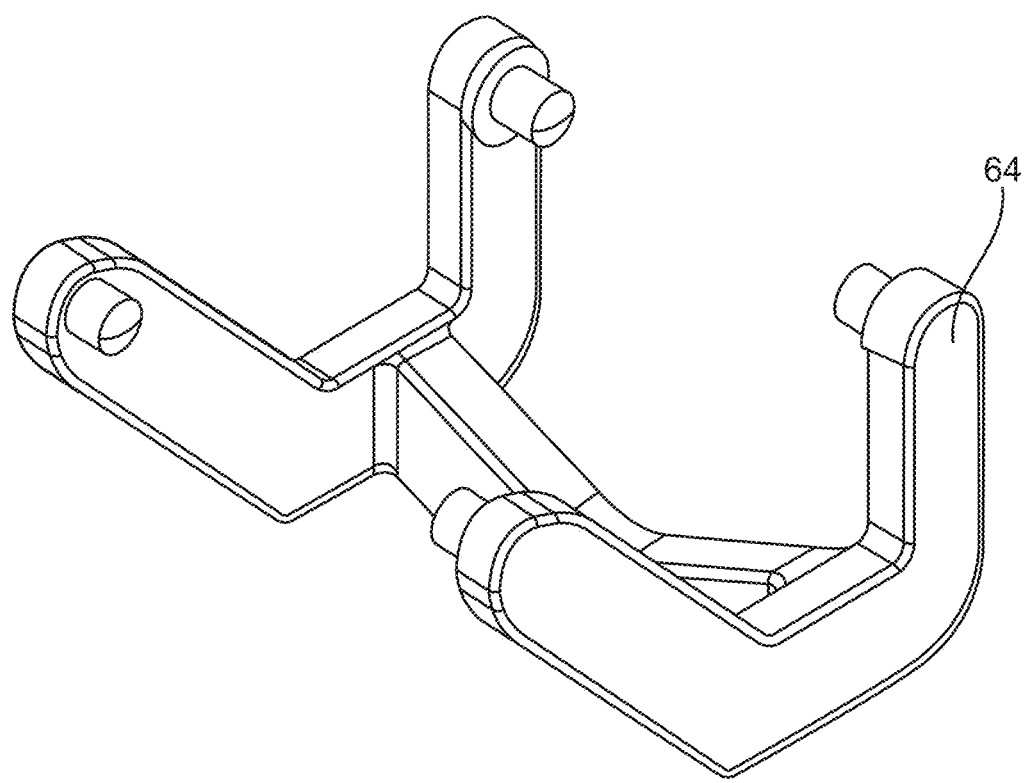
FIGS. 11 and 12 illustrate upper and lower arms respectively of the carrier unit of FIG. 2.
Figure 12:
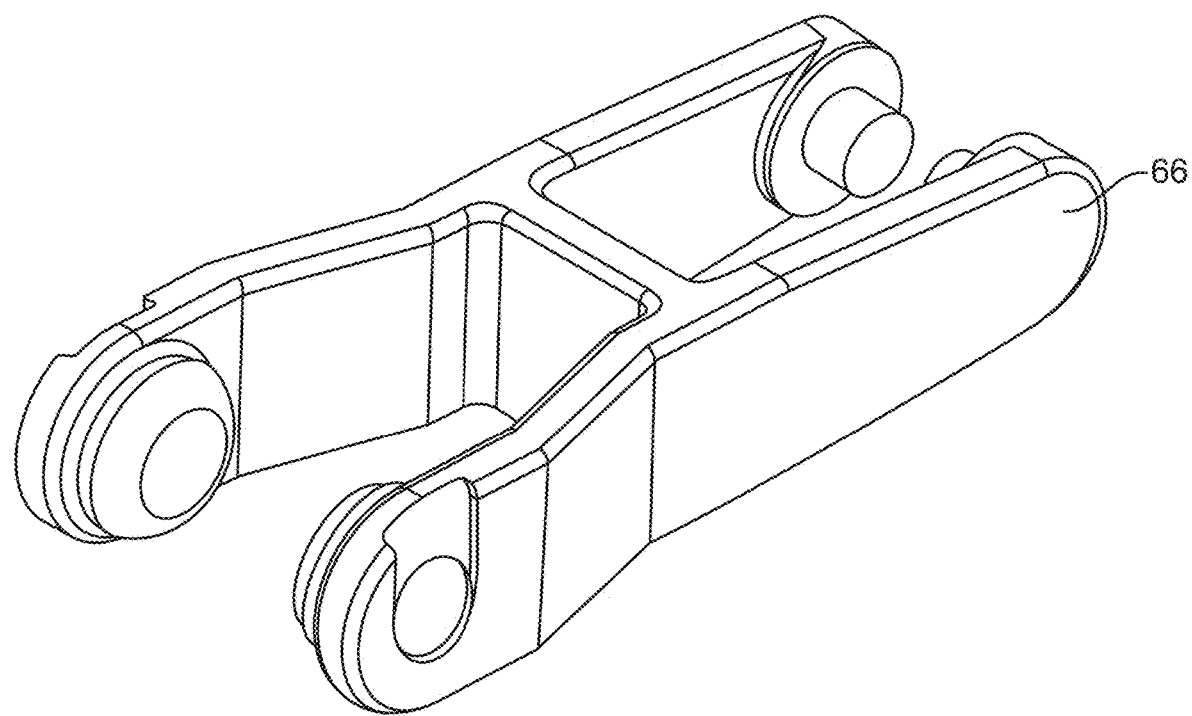

FIG. 9 shows an example of a roller assembly 40. In this example, the roller assembly 40 includes four spaced apart wheel discs, with the two outer wheels having larger diameters than the two inner wheels discs. The wheels have soft material over-molded around the outside for gentle handling. This soft material grips the fruit facilitating rotation. These four wheels facilitate fruit control, rotation, and handling. The four supporting wheels form a concave shape to receive round or semi-round fruit, facilitating maintaining contact between the fruit and several of the discs.

The roller assembly 40 shown includes an axle 44 that mounts into the vertical slot 22 of the link assembly 20, allowing the roller assembly 40 to be raised and lowered relative to the link assembly 20. In the example shown in FIGS. 14 and 15, belts can support and drive the roller assembly 40 in a raised position, such that the rollers support and rotate the fruit located between adjacent rollers.

Feed Belt, Pre-Singulator

In the example of FIG. 1, the system includes a feed belt, pre-singulator sub-system. The feed belt aligns the fruit in a single file row before the fruit reaches the other segments of the sorting system.

In one implementation, the feed belt may be in a v-belt configuration to help increase the percentage of cup fill in the sorting system. The v-belt uses two individual flat belts that run at approximately a 30° angle, turned towards each other, to form a trough or a V-shape for the fruit to align in. These belts may be run at different speeds to improve fruit singulation. The length of the v-belts may be optimized to further increase singulation efficiency. In operation, the fruit is introduced in bulk onto the full-width of the v-belt. As the fruit moves forward, the fruit finds a position on the v-belt and by the time the v-belt pours onto the singulation segment of the sorting system, the fruit is aligned in a single file row.

For increased speed (more cups per second), a second or tandem v-belt (one set of v-belts in front of the other) may be helpful. The second v-belt, at high speeds, may facilitate improving cup fill. The second v-belt can, in some implementations, offer additional control by increasing the speed of the fruit, closer to the sorting conveyor speed. The operator may adjust these speeds to maximize cup fill.

Infeed-Singulation

In the example shown in FIG. 1, the feed belt delivers the fruit in a single file row to the singulation segment, in which the fruit is separated into single pieces located between the rollers of the conveyor.

At the singulation segment, fruit from the pre-singulator v-belts pours onto the rollers of the conveyor, which are in the rotating position (raised) and driven by a 10 mm wide AT5 metric timing belt. The action of roller rotation and incline of the conveyor tend to encourage individual fruit into positions between adjacent rollers. Excess fruit typically falls off the rollers at the now horizontal section immediately after the incline ends. The excess fruit is collected and returned to the pre-singulator belts to be run again.

The speed of the timing belt associated with the rollers may be used to control the direction of rotation of the fruit. For example, if the timing belt is rotating in the same direction of the conveyor but is rotating at a speed that is slower than the conveyor, the fruit will rotate in a direction opposite to the direction of the conveyor movement. If the timing belt is rotating in the same direction of the conveyor but at a speed that is faster than the conveyor, the fruit will rotate in the same direction as the conveyor movement. In some implementations, it is desirable to rotate the fruit in different directions in different segments of the sorting system. For example, rotating the fruit in the same direction as the conveyor movement in the singulation segment may be used to facilitate the singulation process while rotating the fruit in the opposite direction as the conveyor movement in the inspection segment (described below) may facilitate the inspection process by reducing blurring during imaging of the fruit.

Returning to the description of the singulation segment, in this example, the rotation of the fruit in this segment helps to both cingulate the fruit and to help the fruit find an axis to rotate about before the camera box section. By the fruit finding an axis in this segment, the fruit leaves this segment rotating smoothly.

Figure 14:
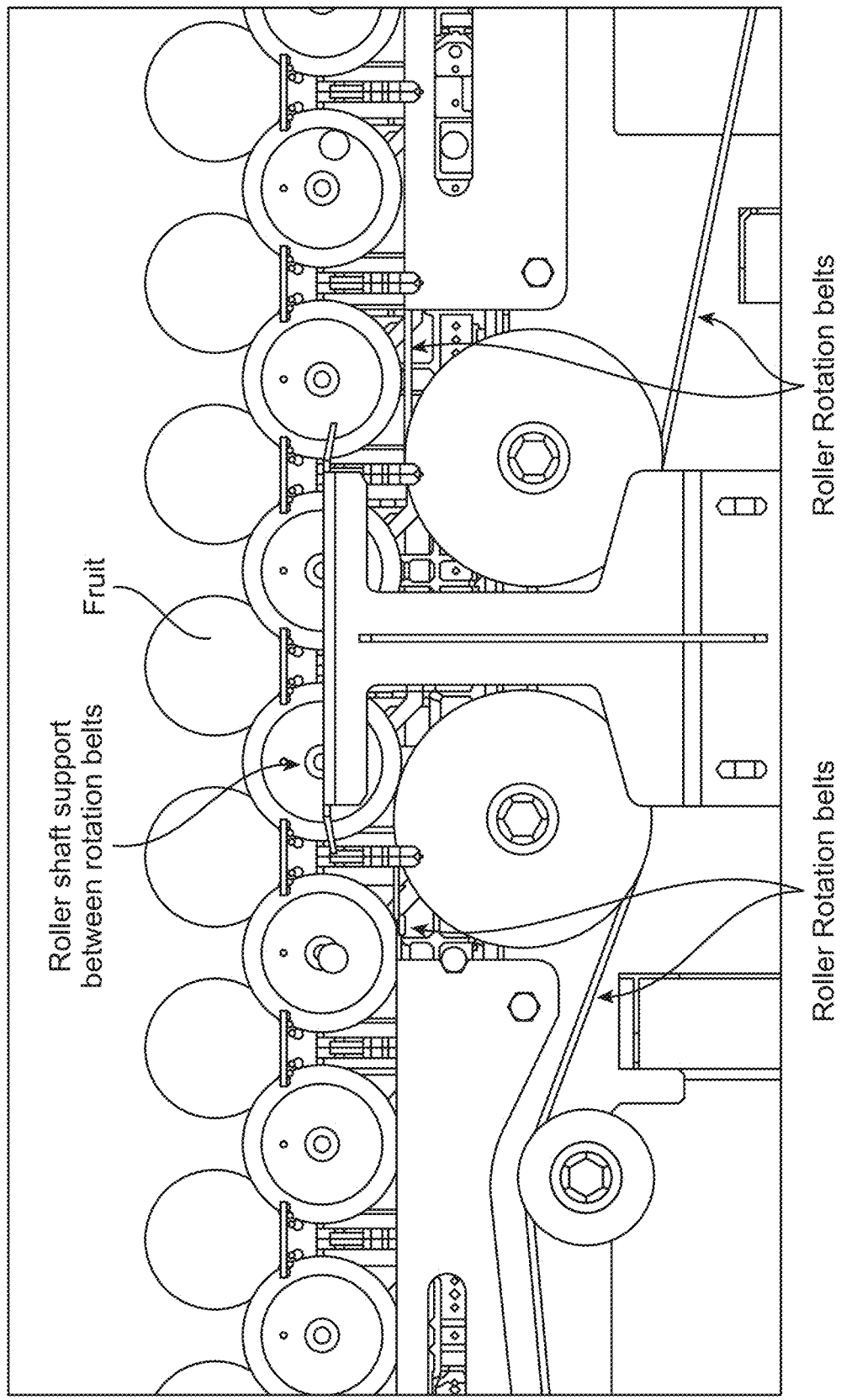
FIGS. 14 and 15 show examples of roller support and rotation components of a fruit sorting system.
Figure 15:
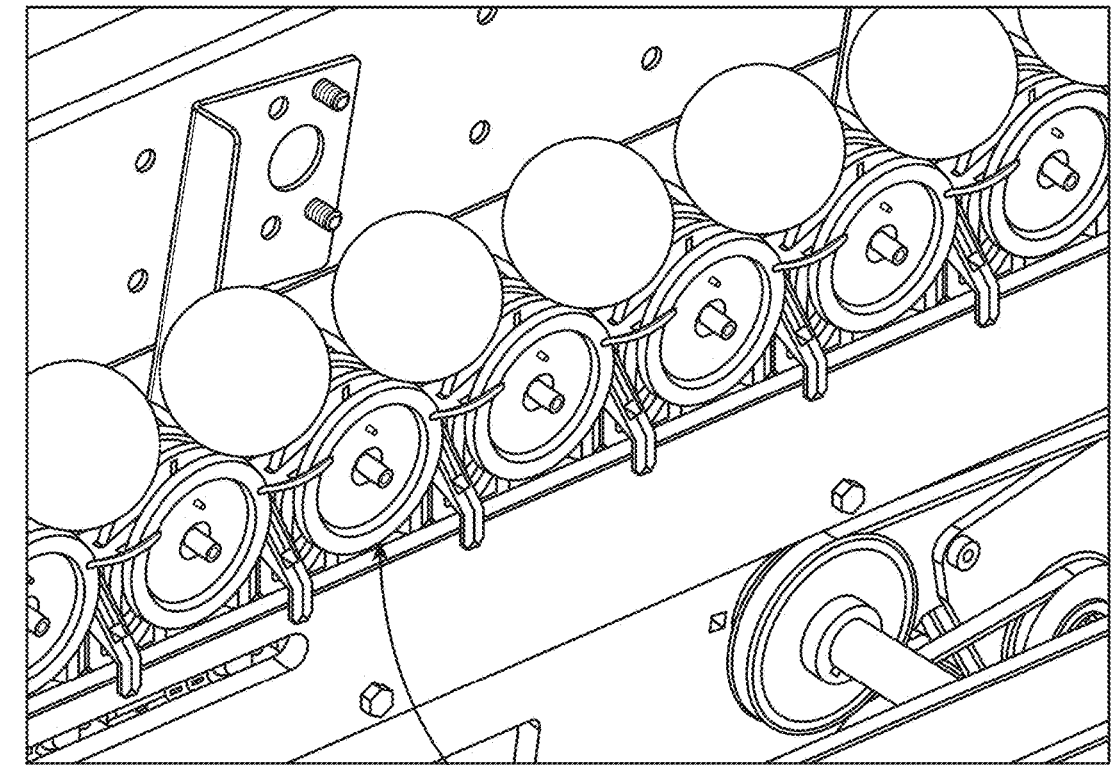
Figure 15:
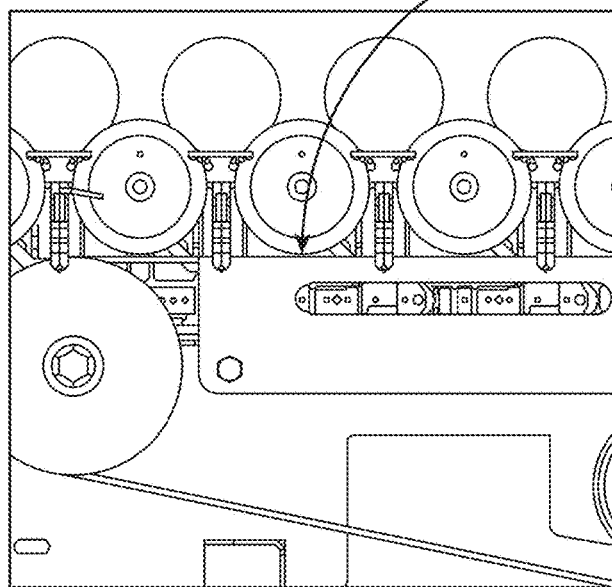
Figure 15:
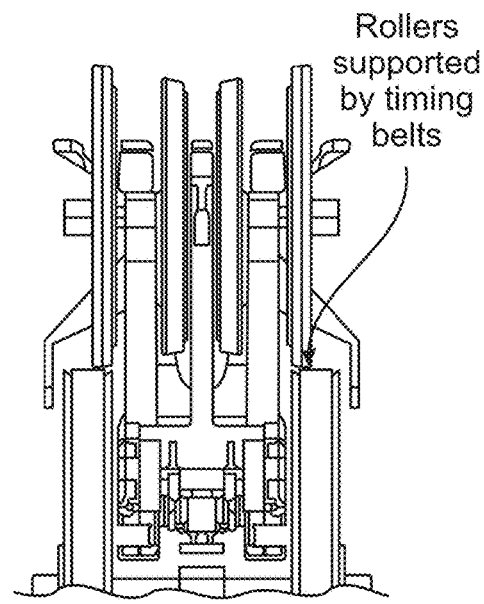

During the singulation segment and some of the subsequent segments in which the fruit is to be rotated as it moves along the conveyor, the conveyor is supported on the AT5 timing belts in these areas and guided transversely by the support structure of the belts. FIGS. 14 and 15 show raised rollers sitting on the belts on either side of the conveyor. As shown in FIG. 14, transferring the conveyor from one roller section to another (like inclined singulator to camera rotation) can include a fixed slide to support the extended roller shaft ends between one rotation and the next.

External Quality (EQ) Camera Inspection

After singulation, the fruit continues through a camera box (labeled EQ in FIG. 1) in which image data relating to the exterior quality of the fruit can be captured by a camera. The captured data may include data about the fruit's size, shape, color, blemishes, or other aspects of the fruit related to its exterior quality. This data can be fed into a system controller, such as a computer or other device with data processing and control functionality.

In this example, the fruit has been rotated by the rollers in the singulation area and has found its axis and is rotating smoothly through the camera box. The rollers are raised and running on a second 10 mm wide AT5 metric timing belt. The belt travels the same direction as the rollers. They run at different speeds causing the rollers to rotate forward or backward according to the speed differential. This in turn rotates the fruit as it passes under the camera box. While the speed of the timing belts may be different, the concept may be the same as in the singulation stage.

After all fruit rotations are complete, the roller shaft extensions are once again supported (in a similar manner to that shown in FIG. 14), allowing fruit and roller rotation to quickly, but gradually, stop rotating. Then the roller shaft support is angled down to lower the fruit into the cup below. The fruit is now sitting in the cup and is no longer on the wheels. The cup is capable of tilting fruit left or right.

Internal Quality (IQ) Inspection

After external quality inspection, the fruit passes through an internal quality box (labeled IQ in FIG. 1) in which data relating to the interior quality of the fruit is captured. This data can also be fed into a system controller, such as a computer or other device with data processing and control functionality. In this segment, the rollers are in the down position (the fruit is not rotated) and the fruit is supported by the cups of the carriers.

Figure 16A:
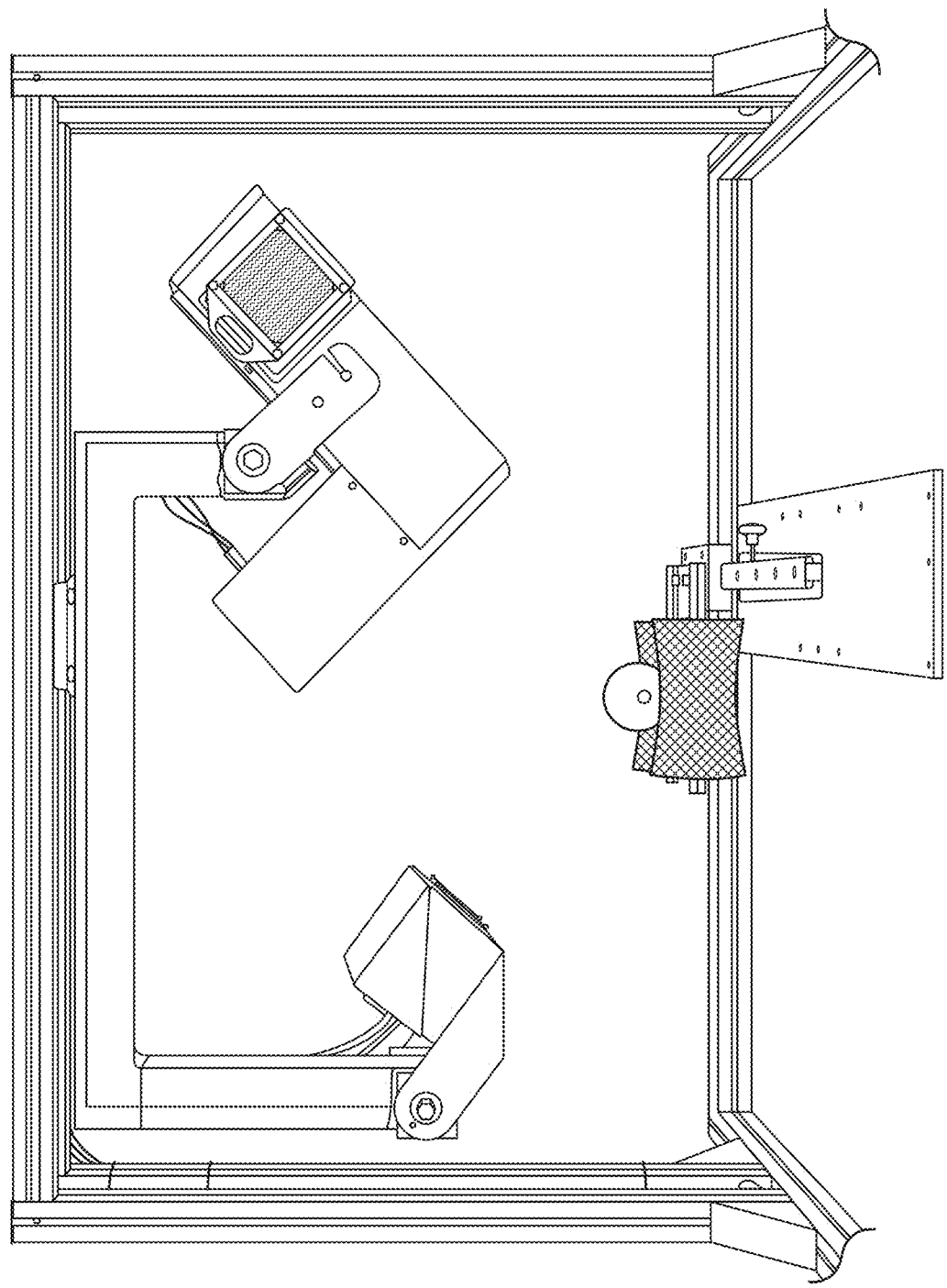
Figure 16C:
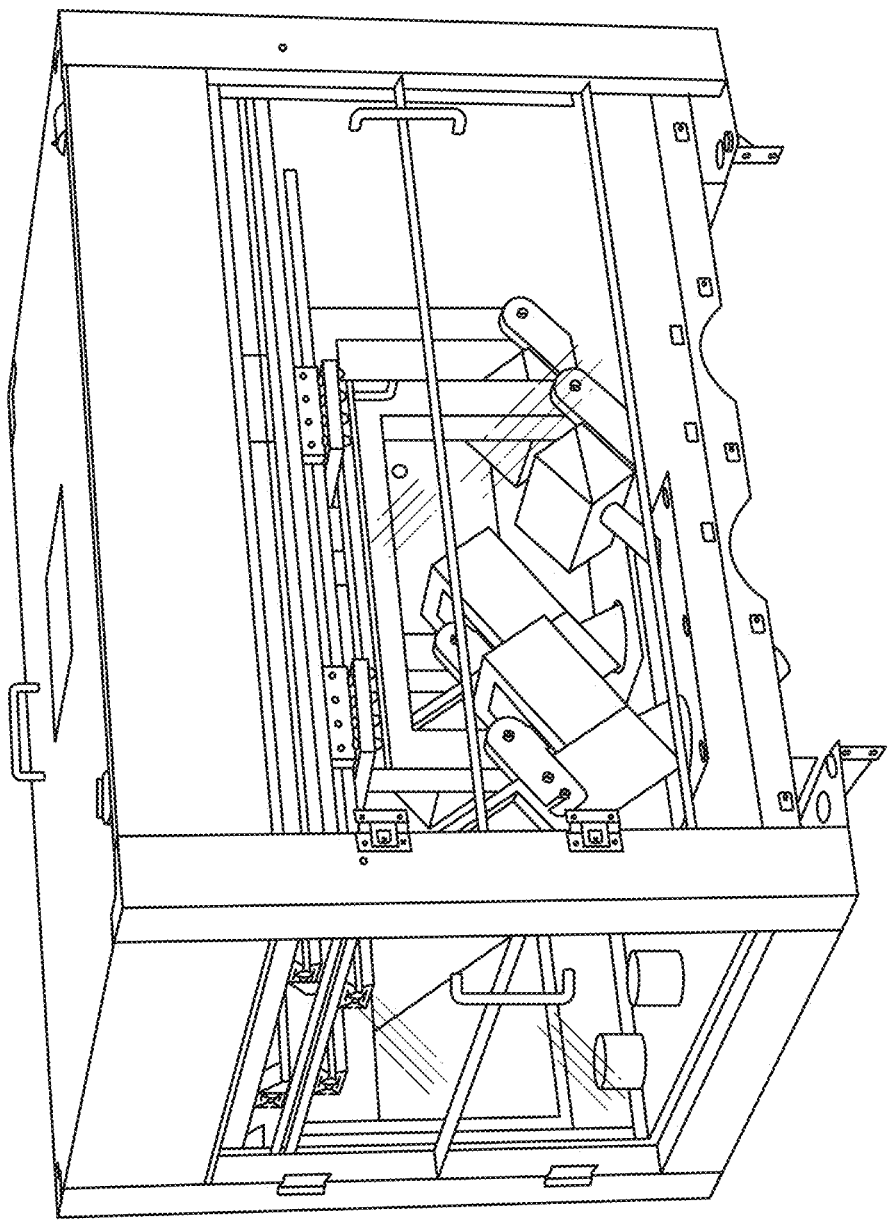

Examples of an internal quality box and associated components are schematically illustrated in FIGS. 16*a-c*. As conceptually illustrated in these figures, high definition light from a halogen bulb located on one side of the camera box is sent through the fruit. A sensor receives the light that has passed through the fruit. The exiting light differential is analyzed by the software to characterize the internal quality of the fruit.

Weighing

Figure 18:
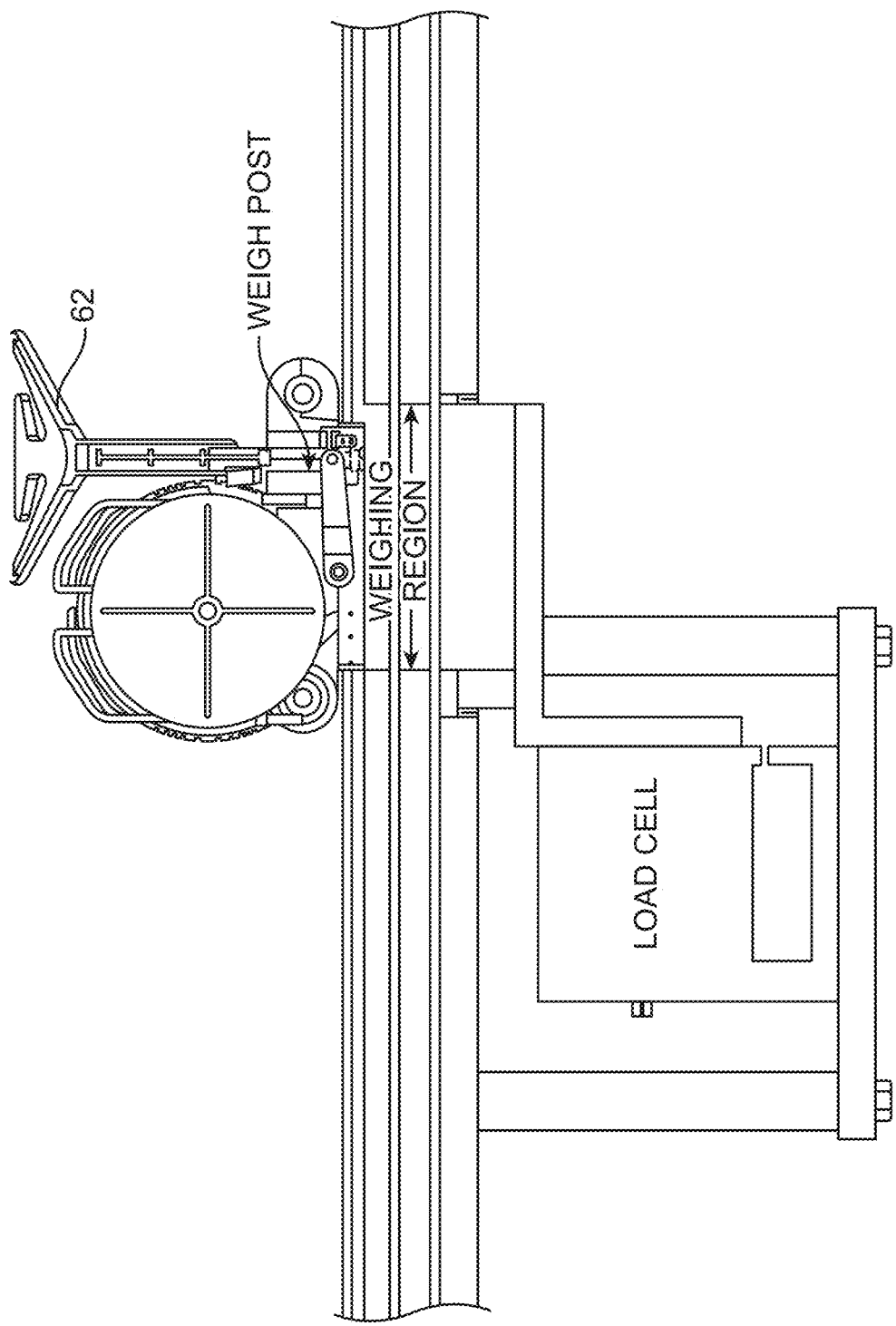
FIGS. 18-20 schematically illustrates the operation of an example of a weighing sub-system of a produce sorting system.

In the example illustrated in FIG. 1, after passing through internal quality inspection, the fruit is weighed. As shown in FIG. 18, during weighing the rollers are in a down position. When in this position, the fruit rests in and is supported by the cup 62.

Figure 17:
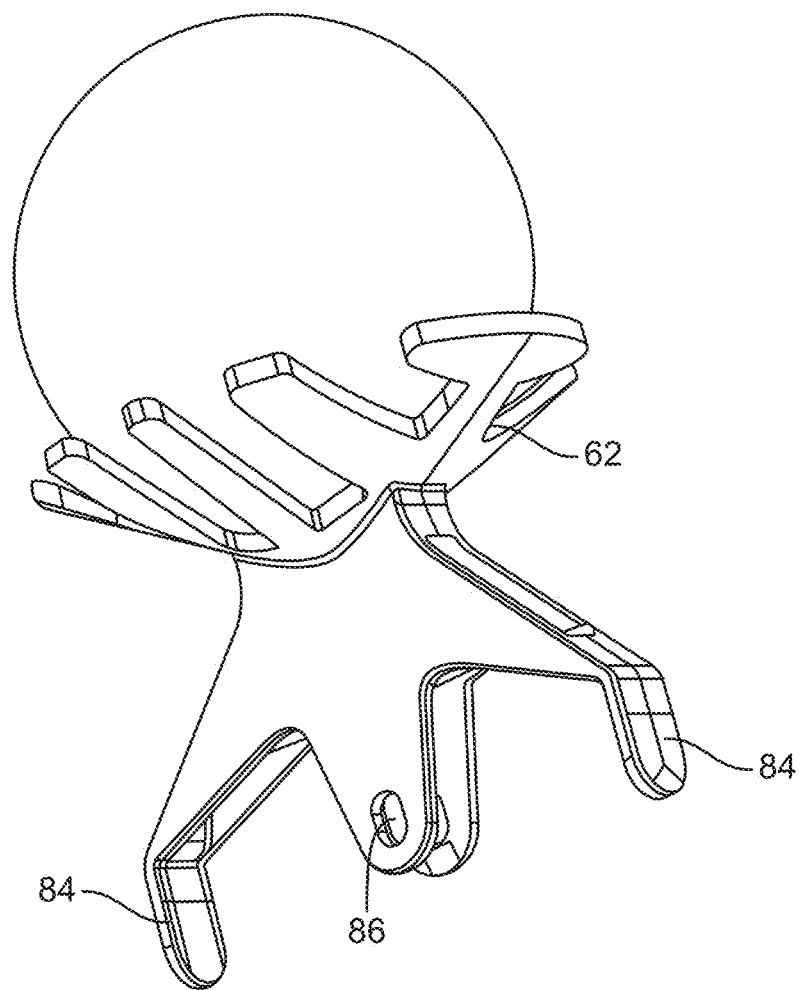
FIG. 17 schematically illustrates a produce item supported by the cup shown in FIG. 8.

In the example shown in FIG. 17, the fruit contact points of the cup 62 are concave in shape capturing the fruit for stability and resisting against the fruit falling off of the carrier. The cup 62 shown in this example includes six elongated fingers and two lateral tee-shaped fingers, and is one example of a cup 62 suitable for holding a variety of fruit sizes (e.g. between 1.5 and 5 inches) stably. The fingers and other aspects of the cup 62 are configured to accommodate four spaced apart wheel discs, as discussed above.

Figure 20:
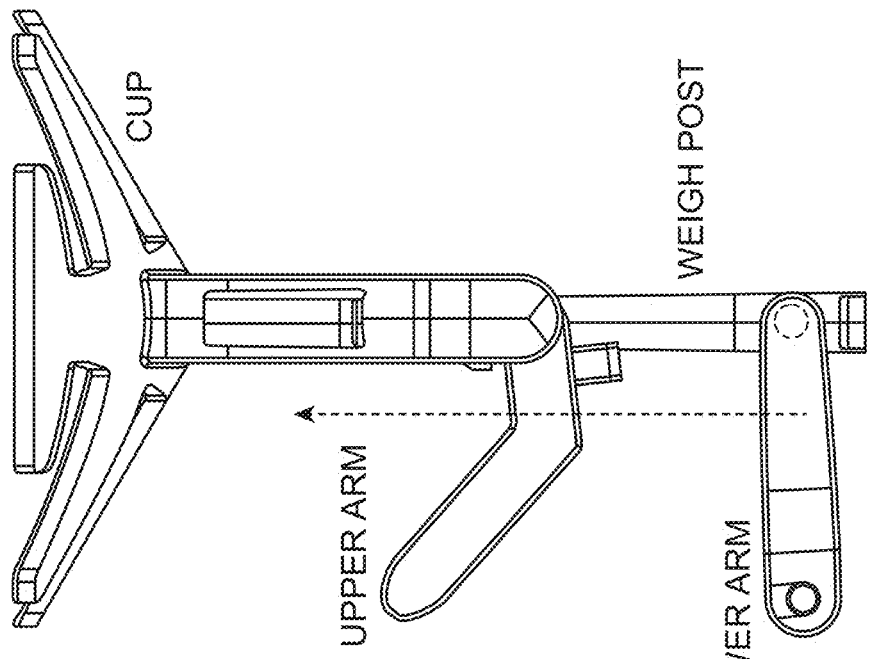
Figure 19:
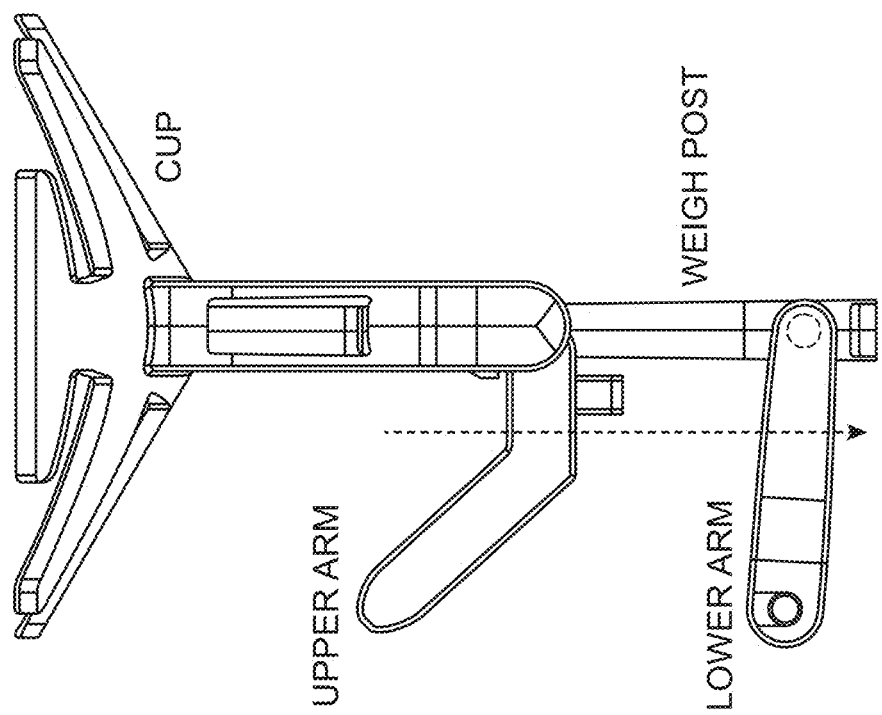

As shown in FIGS. 18-20, the weigh post 68 supports the cup 62 and floats up and down along a vertical axis. When the post 68 travels over a load cell, the fruit is weighed. The system takes a continuous weight measurement and uses an algorithm to obtain a discrete and accurate weight for each piece of fruit. FIG. 7 also illustrates the contact between the bottom of the weigh post 68 and a load cell 82.

As shown in FIGS. 19 and 20, the lower arm 64 and upper arm 66 of the cup assembly pivot on both ends. The weigh post 68 floats linked by the pivot arms. This floating action facilitates more accurate weighing at high speeds. This mechanical linkage includes dual, parallel, pivoting, trailing arms that are attached by pivot points to the weigh post 68. In this example, the linkage allows the weigh post to float. This single upright weigh post 68 is located directly under the fruit. It does not matter how the fruit positions itself in the cup. When the pivot arms supporting the post are parallel and horizontal relative to the direction of the conveyor (e.g. as shown in FIGS. 19 and 20), imbalance forces (e.g. due to an asymmetric fruit shape) will be applied horizontally, such that there is little to no effect on the weight sensed by the load cell. The pivot axes of the lower and upper arms 64, 66 are parallel with the axle 44 of the carrier units to avoid introducing undesired vertical forces to the weigh post 68.

Fruit Distribution-Cup Tipping

Figure 21:
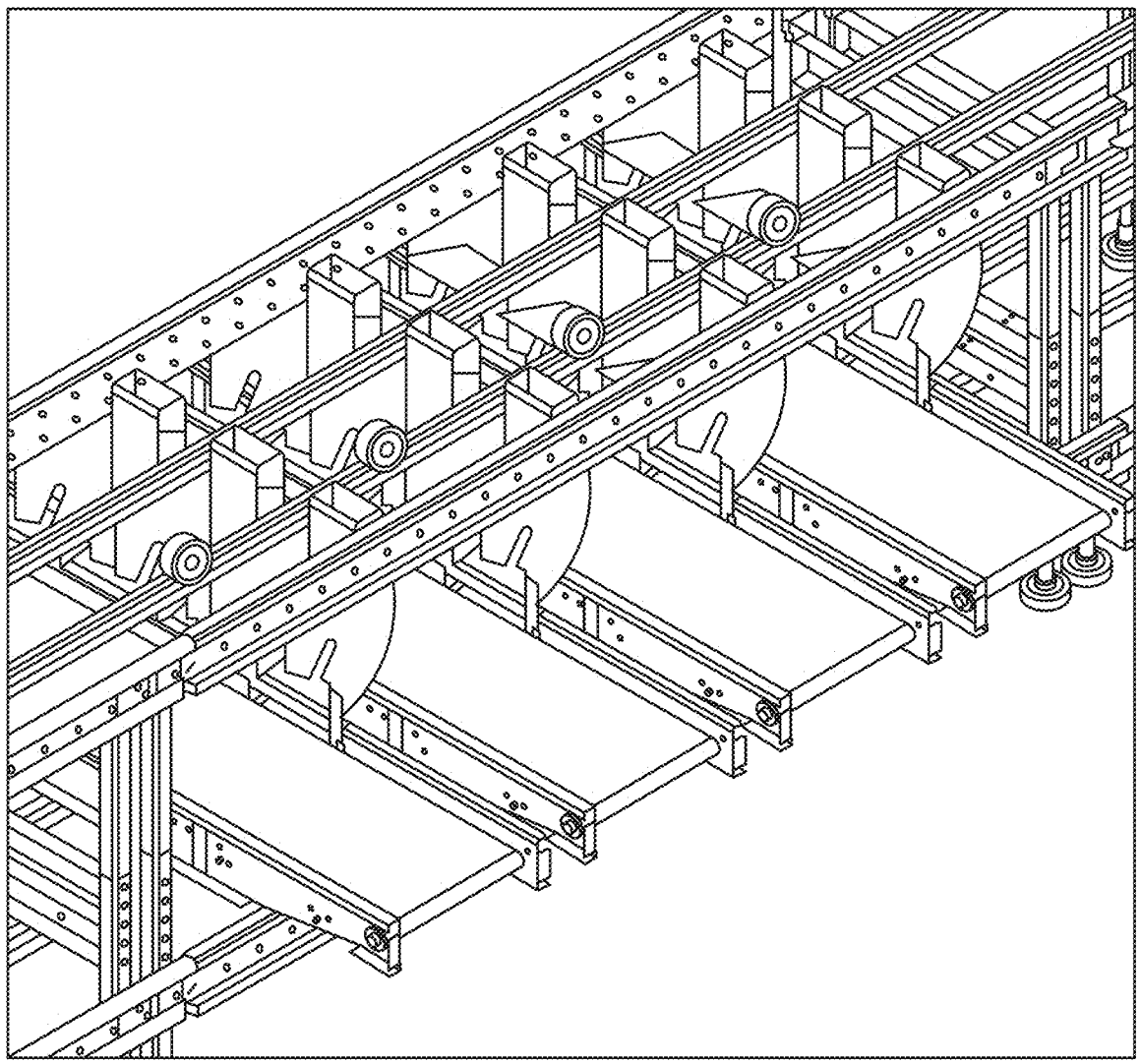
FIG. 21 illustrates an example of a fruit distribution area of a produce sorting system.
Figure 22:
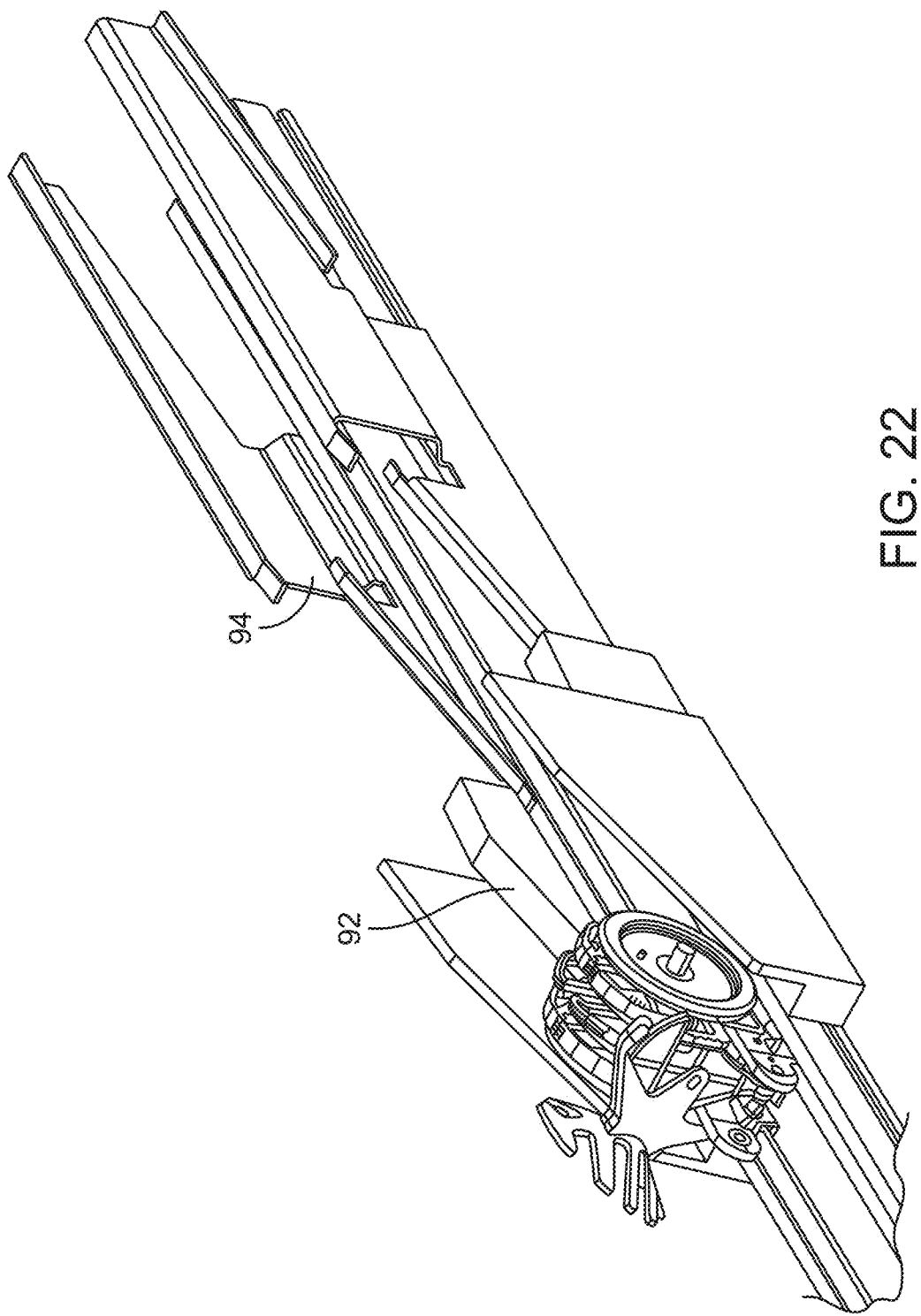
FIGS. 22-26 illustrate an example of cup re-loading of a produce sorting system.
Figure 23:
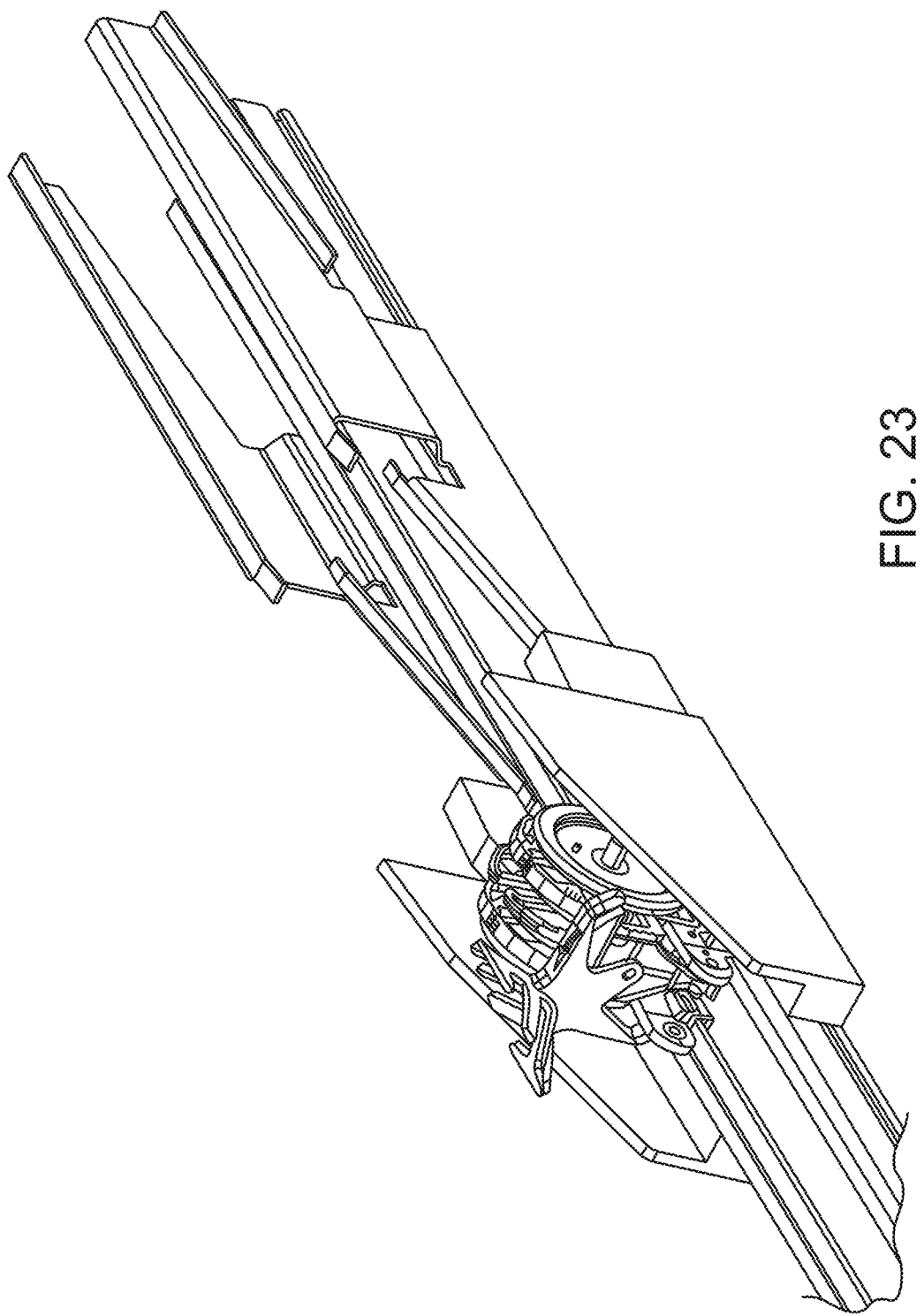
Figure 24:
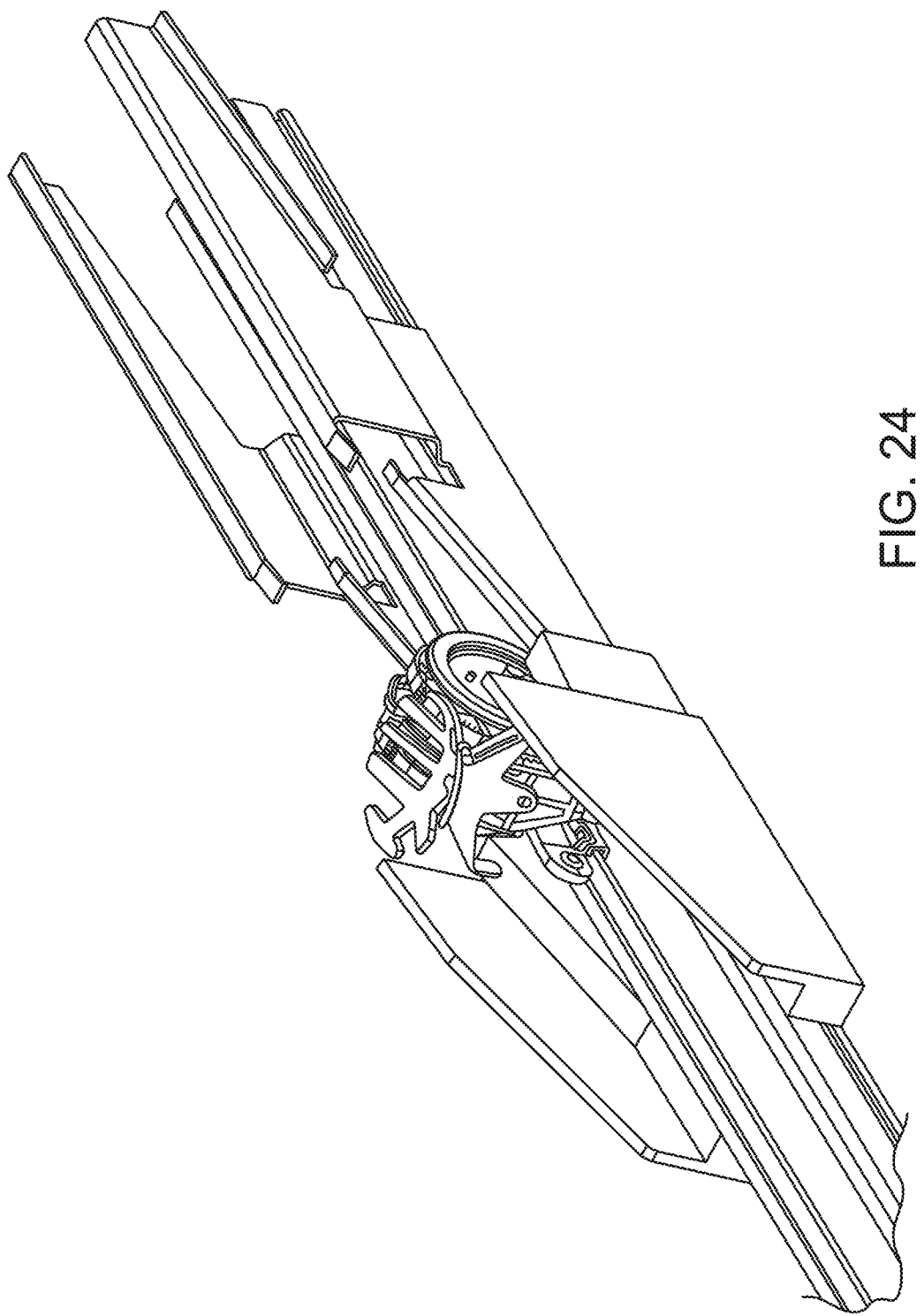
Figure 25:
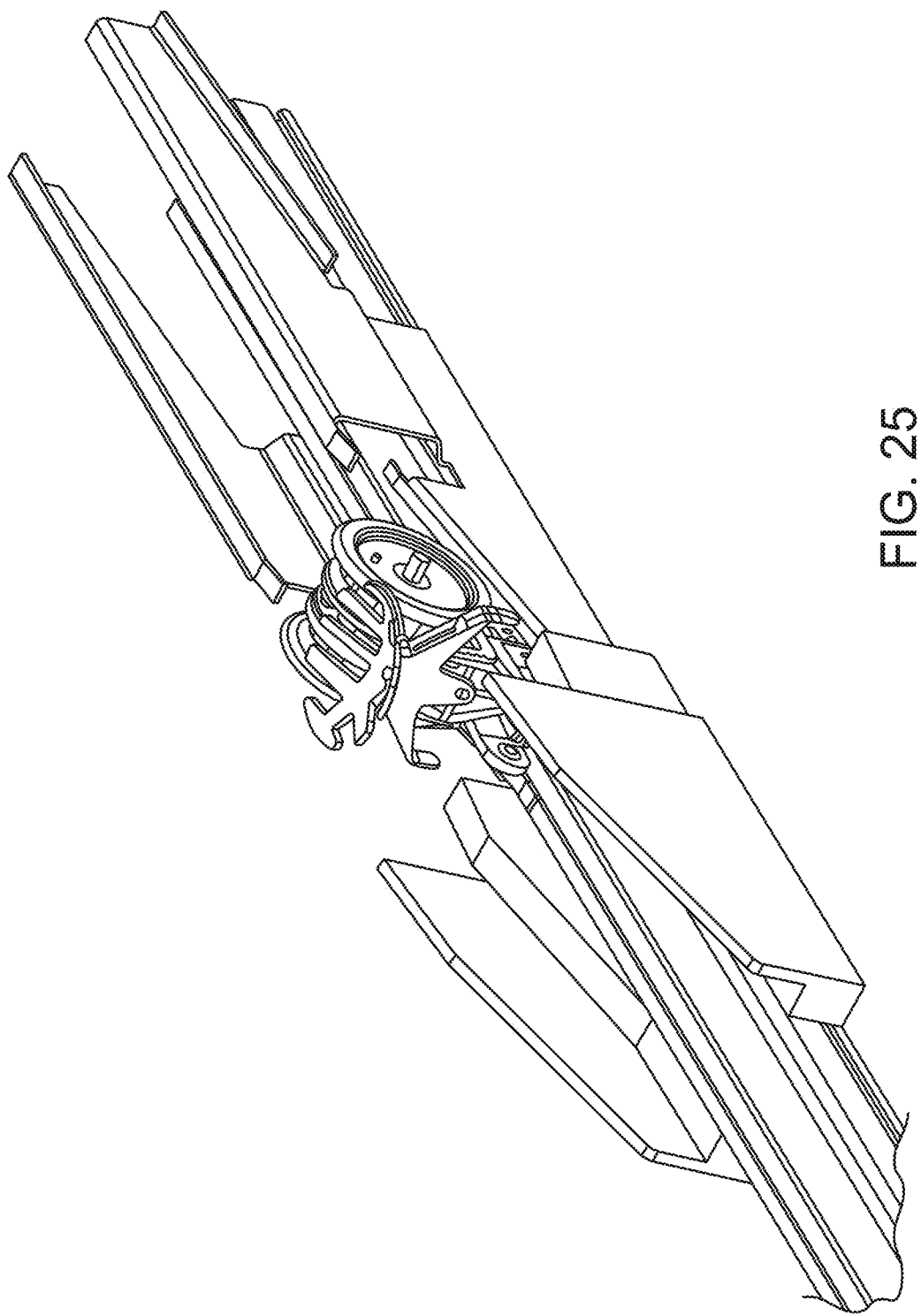
Figure 26:
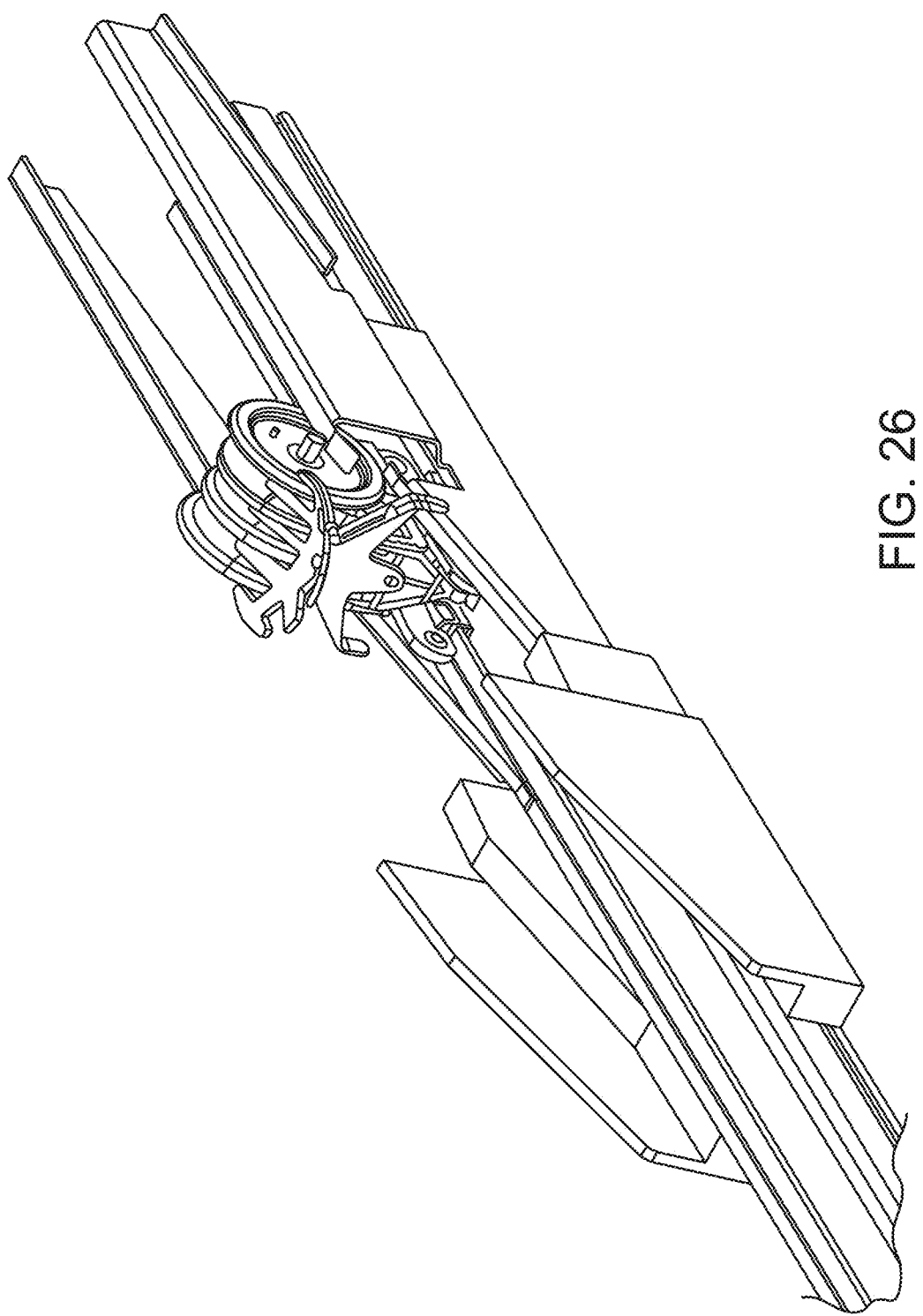

In the example shown in FIG. 1, after the fruit is weighed, it travels to a cup-tipping segment of the system, which is also shown in FIG. 21. The controller of the system can direct fruit into one of several possible outlets of the sorting system based on data collected at previous stages and/or other data.

In the particular example shown in the figures, the cup 62 may be tipped laterally in either direction to eject the fruit into a particular outlet. A solenoid (not shown in detail) can exert a force on one of the arms 84 (see FIG. 17) of the cup 62 to tip the cup over and eject the fruit into a desired outlet. This tipping is facilitated by the elongated slots 86 in the cup. The elongated slots 86 connect to posts (e.g. 88 in FIG. 10), such that the cup can lift slightly relative to the weigh post 68 (to disengage from the center point 72) and rotate laterally to either side relative to the weigh post 68.

In this example, the fruit is lowered from the carrier on the sorting system to runout belts or fruit collection areas. The fruit ejects from the carrier's cup via a letdown chute, soft rotating brush, or rotating foam wheel. The fruit type determines the type of letdown. The runout belts that the fruit pours on are perpendicular to the sizer conveyor (see FIG. 21). There can be as many as 60 or more sizer outlets on a system.

Final Stage

Figure 27A:
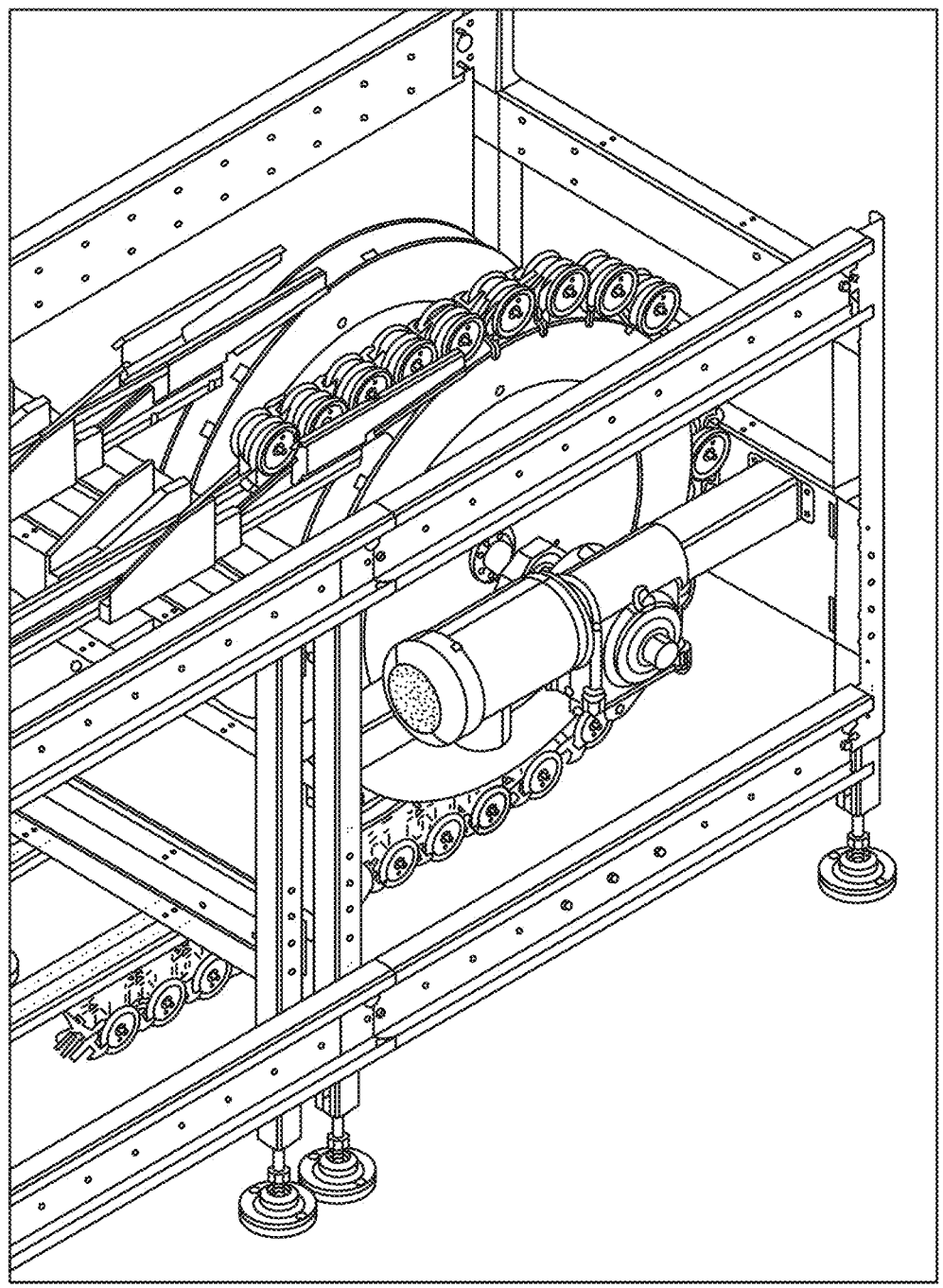
FIGS. 27a and b illustrate an example of a drive sub-system of a produce sorting system.
Figure 27B:
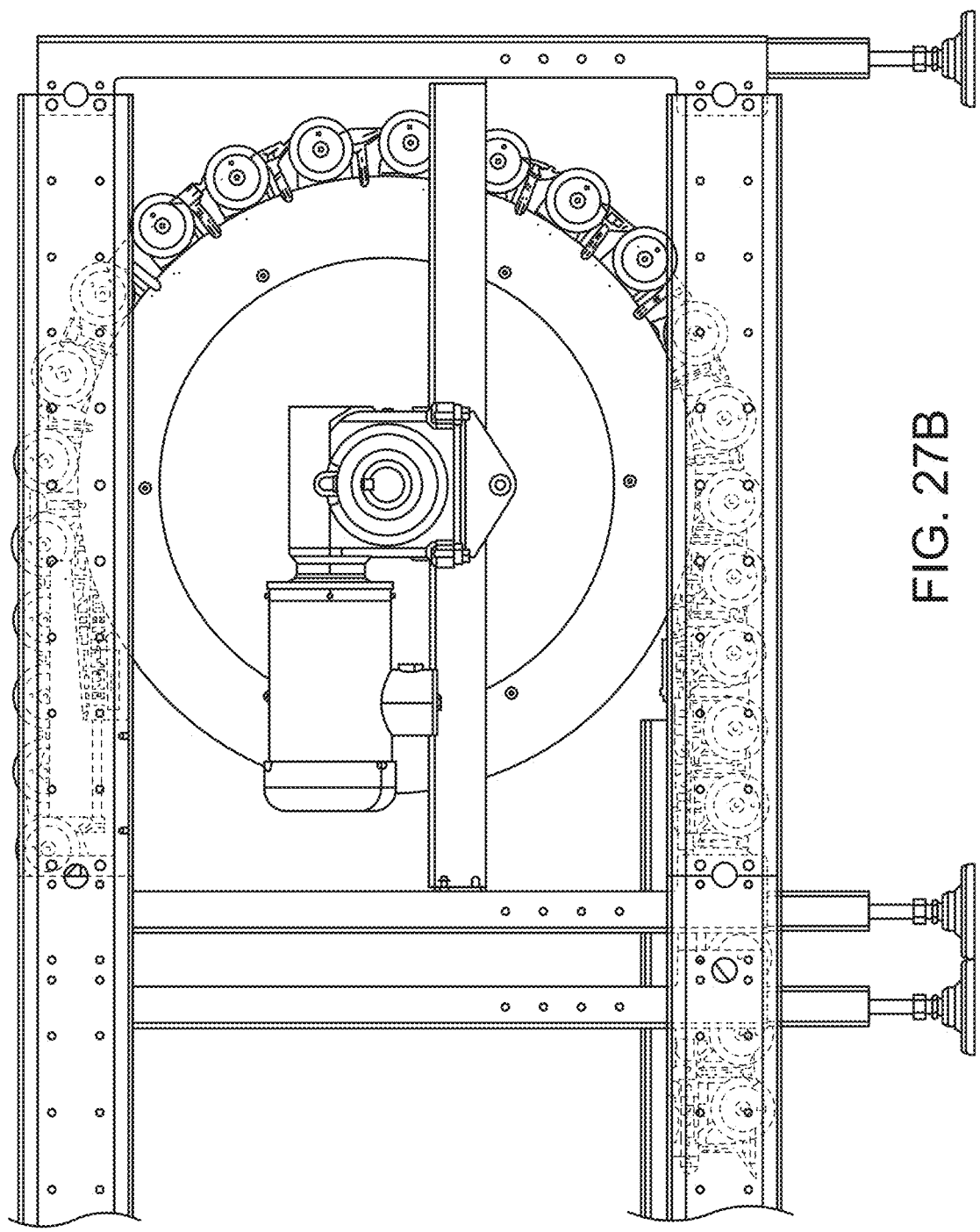

In the example shown in FIG. 1, after cup-tipping, the fruit is out of the cup(s) and now the cup can be returned to the upright position, relocating it on the center point 72 of the weigh post 68. As shown in the example illustrated by FIGS. 22-26, this repositioning may be accomplished in two steps. First, fixed ramps 92 on both sides of the conveyor return the carriers to a raised and upright position followed by a second set of ramps 94 that support and raise the roller assembly 40, preparing the carrier unit for presentation to the drive sprocket. In the example shown in FIGS. 27*a* and *b*, supports of the second set of ramps 94 terminate directly above the shaft for the drive sprocket at which point the rollers are supported by circular discs that are attached to the sprocket. When the conveyor departs, the sprocket, gravity and the two horizontal tracks forms the return track under the sizer. This track supports the assemblies as they return to the feed end of the sizer and holds everything in place until the conveyor reaches the singulator end idler sprocket.

The foregoing has been a description of specific examples of fruit sorting systems and methods encompassed by this patent. These examples are presented not by way of limitation, and additions, deletions, substitutions, modifications, and other changes may be made to the example systems and methods described above without departing from the scope or the spirit of the present inventions.

The invention claimed is:

1. A produce sorting system, comprising:
   (a) a plurality of segments, the segments comprising at least a produce weighing segment and a produce sorting segment;
   (b) a conveyor configured to move produce items to the segments, the conveyor comprising a plurality of carrier units connected to one another, wherein at least some of the carrier units each comprise:
      (i) a carrier frame, the frame comprising a first side, a second side opposite the first side, a first end, and a second end opposite the first end, the carrier frame linked to carrier frames of adjacent carrier units at the first and second ends;

(ii) a produce roller retained by the carrier frame, the produce roller configured to be moved between raised and lowered states relative to the carrier frame; and (iii) a produce cup, the produce cup configured to discharge a produce item from the produce cup at the produce sorting segment by tipping from an upright state to the first side of the carrier frame and tipping from the upright state to the second side of the carrier frame, the produce cup further configured to move along a vertical axis relative to the carrier frame to facilitate weighing the produce item in the produce cup at the produce weighing segment, the produce cup supported by a weighing member when the produce cup is in the upright state, the weighing member including a weighing surface configured to contact a load cell of the weighing segment, wherein the weighing surface is located underneath the produce cup when in the upright state and between the first and second sides of the carrier frame.

2. The produce sorting system of claim 1, wherein the weighing member comprises a post, an end of the post extending between the first and second sides of the carrier frame.

3. The produce sorting system of claim 2, wherein the weighing surface is on the end of the post, and is located directly underneath a center of the produce cup.

4. The produce sorting system of claim 2, wherein the post is connected to the carrier frame.

5. The produce sorting system of claim 2, wherein the post is connected to the carrier frame by a floating arm linkage.

6. The produce sorting system of claim 5, wherein the floating arm linkage comprises a pair of linkage arms, each linkage arm comprising pivot axes that are parallel to a rotation axis of the produce roller.

7. The produce sorting system of claim 1, wherein the produce cup is connected to the post in a rotating fashion.

8. The produce sorting system of claim 7, wherein the produce cup further comprises a pair of tipping arms.

9. The produce sorting system of claim 1, wherein the carrier frame further comprises one or more vertical slots configured to retain the produce roller while allowing the produce roller to move between the raised and lowered states.

10. The produce sorting system of claim 9, wherein the produce roller comprises an axle extending through the one or more vertical slots of the carrier frame.

11. The produce sorting system of claim 1, wherein the carrier frame comprises one or more plastic bodies, the one or more plastic bodies including a pair of internal metal plates extending along the first and second sides of the carrier frame.

12. The produce sorting system of claim 11, wherein the carrier frame is linked to carrier frames of adjacent carrier units by link pins extending through the metal plates.

13. The produce sorting system of claim 1, wherein the conveyor further comprises one or more guide tracks, wherein the carrier frame further comprises one or more guide surfaces configured to interact with the guide tracks.

14. The produce sorting system of claim 13, wherein the one or more guide tracks comprise a pair of guide tracks, and wherein the first side of the carrier frame includes one of the guide surfaces and the second side of the carrier frame includes the other guide surface.

15. The produce sorting system of claim 1, wherein the carrier frame comprises a first side carrier frame and a second side carrier frame, the weighing surface located between the first and second side carrier frames.

16. A carrier unit for a produce sorting system, the carrier unit comprising:

(i) a carrier frame, the frame comprising a first side, a second side opposite the first side, a first end, and a second end opposite the first end, the carrier frame including linking structure at the first and second ends configured to link to carrier frames of adjacent carrier units;

(ii) a produce roller retained by the carrier frame, the produce roller configured to be moved between raised and lowered states relative to the carrier frame; and (iii) a produce cup, the produce cup configured to tip from an upright state to the first side of the carrier frame and to tip from the upright state to the second side of the carrier frame, the produce cup further configured to move along a vertical axis relative to the carrier frame, the produce cup supported by a weighing member when the produce cup is in the upright state, the weighing member including a weighing contact surface located underneath the produce cup when in the upright state and between the first and second sides of the carrier frame.

17. The carrier unit of claim 16, wherein the weighing member comprises a post, an end of the post extending between the first and second sides of the carrier frame.

18. The carrier unit of claim 17, wherein the weighing contact surface is on the end of the post, and is located directly underneath a center of the produce cup.

19. The carrier unit of claim 17, wherein the post is connected to the carrier frame.

20. The carrier unit of claim 17, wherein the post is connected to the carrier frame by a floating arm linkage.

21. The carrier unit of claim 20, wherein the floating arm linkage comprises a pair of linkage arms, each linkage arm comprising pivot axes that are parallel to a rotation axis of the produce roller.

22. The carrier unit of claim 16, wherein the produce cup is connected to a post in a rotating fashion.

23. The carrier unit of claim 22, wherein the produce cup further comprises a pair of tipping arms.

24. The carrier unit of claim 16, wherein the carrier frame further comprises one or more vertical slots configured to retain the produce roller while allowing the produce roller to move between the raised and lowered states.

25. The carrier unit of claim 24, wherein the produce roller comprises an axle extending through the one or more vertical slots of the carrier frame.

26. The carrier unit of claim 16, wherein the carrier frame comprises one or more plastic bodies, the one or more plastic bodies including a pair of internal metal plates extending along the first and second sides of the carrier frame.

27. The carrier unit of claim 26, wherein the carrier frame is configured to link to carrier frames of adjacent carrier units by link pins extending through the metal plates.

28. The carrier unit of claim 16, wherein the carrier frame further comprises one or more guide surfaces configured to interact with guide tracks of a produce sorting system.

29. The carrier unit of claim 28, wherein the first side of the carrier frame includes one of the guide surfaces and the second side of the carrier frame includes the other guide surface.

30. The carrier unit of claim 16, wherein the carrier frame comprises a first side carrier frame and a second side carrier frame, the weighing contact surface located between the first and second side carrier frames.

\* \* \* \* \*